(12) United States Patent
Shan et al.

(10) Patent No.: US 12,360,041 B2
(45) Date of Patent: Jul. 15, 2025

(54) LASER LIGHT PROPAGATION SYSTEMS FOR IRRADIATING A SAMPLE IN A FLOW STREAM AND METHODS FOR USING SAME

(71) Applicant: Becton, Dickinson and Company, Franklin Lakes, NJ (US)

(72) Inventors: Bing Shan, San Jose, CA (US); Jizuo Zou, San Jose, CA (US); Svitlana Berezhna, Los Gatos, CA (US); Eric D. Diebold, Menlo Park, CA (US); An-Dien Nguyen, Fremont, CA (US); Fedor Ilkov, Morgan Hill, CA (US); Mark Dorighi, Fremont, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 74 days.

(21) Appl. No.: 17/400,741

(22) Filed: Aug. 12, 2021

(65) Prior Publication Data

US 2022/0074858 A1 Mar. 10, 2022

Related U.S. Application Data

(60) Provisional application No. 63/076,650, filed on Sep. 10, 2020.

(51) Int. Cl.
*G01N 21/64* (2006.01)
*G01J 3/02* (2006.01)
(Continued)

(52) U.S. Cl.
CPC ........ *G01N 21/6428* (2013.01); *G01J 3/4406* (2013.01); *G01N 15/1429* (2013.01); *G01N 21/6486* (2013.01); *G01N 2015/1006* (2013.01)

(58) Field of Classification Search
None
See application file for complete search history.

(56) References Cited

U.S. PATENT DOCUMENTS

| | | | |
|---|---|---|---|
| 5,231,463 | A | 7/1993 | Shambaugh |
| 5,528,045 | A | 7/1996 | Hoffman et al. |
| | | (Continued) | |

OTHER PUBLICATIONS

Green CW (continuous wave) diode-pumped (DPSS) laser for spectroscopy—527 nm. "Laser-Export Co..". Accessed Jan. 2, 2013. http://laser-export.com/prod/413.html. (Year: 2013).*

*Primary Examiner* — Elizabeth A Robinson
*Assistant Examiner* — Brittany I Fisher
(74) *Attorney, Agent, or Firm* — Khin K. Chin; Bret E. Field; BOZICEVIC, FIELD & FRANCIS LLP

(57) ABSTRACT

Aspects of the disclosure include systems for irradiating a sample in a flow stream. Systems according to certain embodiments include a light propagator having a first fiber optic operably coupled to a first laser and configured to receive light from the first laser at a proximal end and to convey the laser light from a distal end to a first position on the flow stream and a second fiber optic operably coupled to a second laser and configured to receive light from the second laser at a proximal end and to convey the laser light from a distal end to a second position on the flow stream. Methods for irradiating a sample in a flow stream with the subject systems and detecting light from two or more positions on irradiated flow stream are also provided.

14 Claims, 9 Drawing Sheets

(51) Int. Cl.
*G01J 3/10* (2006.01)
*G01J 3/44* (2006.01)
*G01N 15/10* (2024.01)
*G01N 15/14* (2024.01)
*G01N 15/1429* (2024.01)
*G01N 15/1434* (2024.01)

(56) References Cited

U.S. PATENT DOCUMENTS

| | | |
|---|---|---|
| 6,139,800 A | 10/2000 | Chandler |
| 2004/0061853 A1 | 4/2004 | Blasenheim |
| 2010/0220315 A1* | 9/2010 | Morrell ............. G01N 15/1436 356/73 |
| 2014/0374630 A1 | 12/2014 | Saiyed et al. |
| 2016/0290915 A1* | 10/2016 | Chen ................. G01N 15/1459 |
| 2016/0334618 A1 | 11/2016 | Hargis et al. |
| 2019/0040356 A1 | 2/2019 | Durack et al. |
| 2020/0333612 A1* | 10/2020 | Manassen ............. G02B 27/48 |

\* cited by examiner

LASER LIGHT PROPAGATION SYSTEMS FOR IRRADIATING A SAMPLE IN A FLOW STREAM AND METHODS FOR USING SAME

CROSS-REFERENCE TO RELATED APPLICATION

Pursuant to 35 U.S.C. § 119 (e), this application claims priority to the filing dates of U.S. Provisional Patent Application Ser. No. 63/076,650 filed Sep. 10, 2020, the disclosure of which application is incorporated herein by reference in their entirety.

INTRODUCTION

Light detection is often used to characterize components of a sample (e.g., biological samples), for example when the sample is used in the diagnosis of a disease or medical condition. When a sample is irradiated, light can be scattered by the sample, transmitted through the sample as well as emitted by the sample (e.g., by fluorescence). Variations in the sample components, such as morphologies, absorptivity and the presence of fluorescent labels may cause variations in the light that is scattered, transmitted or emitted by the sample. To quantify these variations, the light is collected and directed to the surface of a detector.

One technique that utilizes light detection to characterize the components in a sample is flow cytometry. Using data generated from the detected light, properties of the components can be recorded and where desired material may be sorted. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. Within the flow cell, a liquid sheath is formed around the cell stream to impart a substantially uniform velocity on the cell stream. The flow cell hydrodynamically focuses the cells within the stream to pass through the center of a light source in a flow cell. Light from the light source can be detected as scatter or by transmission spectroscopy or can be absorbed by one or more components in the sample and re-emitted as luminescence.

SUMMARY

Aspects of the disclosure include systems for irradiating a sample in a flow stream. Systems according to certain embodiments include a light propagator having a first fiber optic operably coupled to a first laser and configured to receive light from the first laser at a proximal end and to convey the laser light from a distal end to a first position on the flow stream and a second fiber optic operably coupled to a second laser and configured to receive light from the second laser at a proximal end and to convey the laser light from a distal end to a second position on the flow stream. Methods for irradiating a sample in a flow stream with the subject systems and detecting light from two or more positions on irradiated flow stream are also provided.

In embodiments, systems include a flow cell having a flow path for propagating a flow stream, a light propagation component having a first fiber optic operably coupled to a first laser and configured to receive light from the first laser at a proximal end and to convey the laser light from a distal end to a first position on the flow stream and a second fiber optic operably coupled to a second laser and configured to receive light from the second laser at a proximal end and to convey the laser light from a distal end to a second position on the flow stream and a light detection component having one or more photodetectors configured to detect light from the first position on the flow stream and the second position on the flow stream. In some embodiments, one or more of the lasers is a continuous wave laser. In certain embodiments, one or more of the lasers are monochromatic lasers having a single specific irradiation wavelength. In some instances, each fiber optic is independently a single mode fiber optic or a multi-mode fiber optic. In certain instances, the first fiber optic is a single mode fiber optic and the second fiber optic is a single mode fiber optic. In other instances, the first fiber optic is a multi-mode fiber optic and the second fiber optic is a single mode fiber optic. In yet other instances, the first fiber optic is a single mode fiber optic and the second fiber optic is a multi-mode fiber optic. In still other instances, the first fiber optic is a multi-mode fiber optic and the second fiber optic is a multi-mode fiber optic. In certain instances, the light propagation component includes one or more fiber optic bundles, such as where the first laser is operably coupled to the proximal end of a first fiber optic bundle and the second laser is operably coupled to the proximal end of a second fiber optic bundle. In these instances, the fiber optic bundle operably coupled to the first laser and the second laser may be each independently a single mode fiber optic bundle or a multi-mode fiber optic bundle.

In some embodiments, the light propagation component includes an optical adjustment component in optical communication with a distal end of each fiber optic. In some instances, the optical adjustment component is in physical contact with the distal end of the light propagation component. In other embodiments, the optical adjustment component is affixed to the distal end of the light propagation component. In yet other embodiments, the optical adjustment component is co-molded to the distal end of the light propagation component. In certain embodiments, the optical adjustment component is a biconic lens. In certain embodiments, the optical adjustment component includes an achromatic optical assembly configured to image a distal end of each fiber optic onto the flow stream.

In embodiments, lasers of the subject systems are operably coupled to the proximal end of each fiber optic and light from each laser is conveyed to the flow stream from the distal end of the fiber optic. In some embodiments, each fiber optic has a distal end having a shape that is configured to generate a predetermined beam profile on the stream. In some instances, each fiber optic has a distal end that is configured to generate a substantially constant beam profile across the horizontal axis of the flow stream. In certain instances, each fiber optic has a distal end that is configured to generate a top-hat beam profile across the horizontal axis of the flow stream. In some embodiments, the distal end of the fiber optic has a polygonal shaped cross section. For instance, in one example, the distal end of the fiber optic has a square cross-section. In another example, the distal end of the fiber optic has a rectangular cross-section. In yet another example, the distal end of the fiber optic has a hexagonal cross-section.

Laser light from the distal end of each fiber optic is conveyed to a different position on the flow stream. In some instances, light from the second laser is conveyed by the second fiber optic to a position on the flow stream that is downstream from the position of light conveyed from the distal end of the first fiber optic. In certain instances, the second position is 0.2 mm or more downstream from the first position on the flow stream. In some embodiments, systems include three or more lasers, such as four or more lasers and including 5 or more lasers, where each laser is operably coupled to a distinct fiber optic and light from each of the lasers is conveyed to a different position on the flow stream. In certain embodiments, the light propagation component is configured to propagate each beam of laser light to positions on the flow stream that are separated by 0.2 mm or more.

Systems according to certain embodiments also include a light detection component configured to detect light from the irradiated flow stream. In some embodiments, systems include one or more photodetectors configured to detect light from each position on the flow stream irradiated by the lasers of the light source. In some instances, the photodetector component includes a photodetector array. In certain instances, the light detection component includes an optical propagation component configured to convey light from each position irradiated on the flow stream to the photodetector. In some embodiments, the optical propagation component includes fiber optics. In some instances, the optical propagation component includes a single fiber optic. In certain instances, the light detection component includes a single fiber optic in optical communication with a single photodetector.

Aspects of the present disclosure also include methods for irradiating a sample in a flow stream. In embodiments, methods include irradiating with a light source a first position on the flow stream with a first beam of laser light and a second position on the flow stream with a second beam of laser light and detecting light from the irradiated flow stream. In some embodiments, the light source includes a first laser, a second laser and a light propagation component having a first fiber optic operably coupled to the first laser and configured to receive light from the first laser at a proximal end and to convey the laser light from a distal end to a first position on the flow stream and a second fiber optic operably coupled to the second laser and configured to receive light from the second laser at a proximal end and to convey the laser light from a distal end to a second position on the flow stream. In some instances, methods include receiving light from the first laser and the second laser at the proximal end of a multi-mode fiber optic.

In practicing the subject methods, laser light is conveyed from the distal end of each fiber optic to different positions on the flow stream. In some embodiments, laser light from the first laser is conveyed from the distal end of the first fiber optic to a first position on the flow stream and laser light from the second laser is conveyed from the distal end of the second fiber optic to a position on the flow stream that is downstream from the first position on the flow stream. In certain embodiments, the second position is downstream from the first position by 0.2 mm or more. In certain embodiments, laser light from the distal end of three or more fiber optics is conveyed to different positions on the flow stream. In certain instances, the light from the three or more lasers is conveyed to positions on the flow stream that are each separated by 0.2 mm or more.

In some instances, laser light from the distal end of each fiber optic is in propagated through an optical adjustment component to the flow stream. For instance, in one example laser light conveyed from the distal end of each fiber optic is passed through an optical adjustment component that is in physical contact with the light propagation component. In another example, laser light conveyed from the distal end of each fiber optic is passed through an optical adjustment component that is affixed to the end of the light propagation component. In still another example, laser light conveyed from the distal end of each fiber optic is passed through an optical adjustment component that is co-molded to the end of the light propagation component. In some embodiments, laser light from each fiber optic is propagated through a biconic lens to the flow stream. In other embodiments, the laser light from each fiber optic is propagated through an achromatic optical assembly to the flow stream.

In some embodiments, methods include irradiating the flow stream with beams of laser light that each has a predetermined beam profile. In some instances, methods include generating beams of laser light having a predetermined beam profile, such as a substantially constant beam profile across a horizontal axis of the flow stream (e.g., an axis orthogonal to the longitudinal axis of the flow stream as described in greater detail below). For example, the beams of laser light propagated from the distal end of the fiber optic may have a top-hat beam profile across a horizontal axis of the flow stream. In certain embodiments, the distal end of each fiber optic may be configured to generate a desired beam profile of the laser light. In some instances, the distal end of the fiber optic has a polygonal cross-section, such as a square cross-section, a rectangular cross-section or a hexagonal cross-section.

BRIEF DESCRIPTION OF THE FIGURES

The invention may be best understood from the following detailed description when read in conjunction with the accompanying drawings. Included in the drawings are the following figures.

DETAILED DESCRIPTION

Figure 1A:
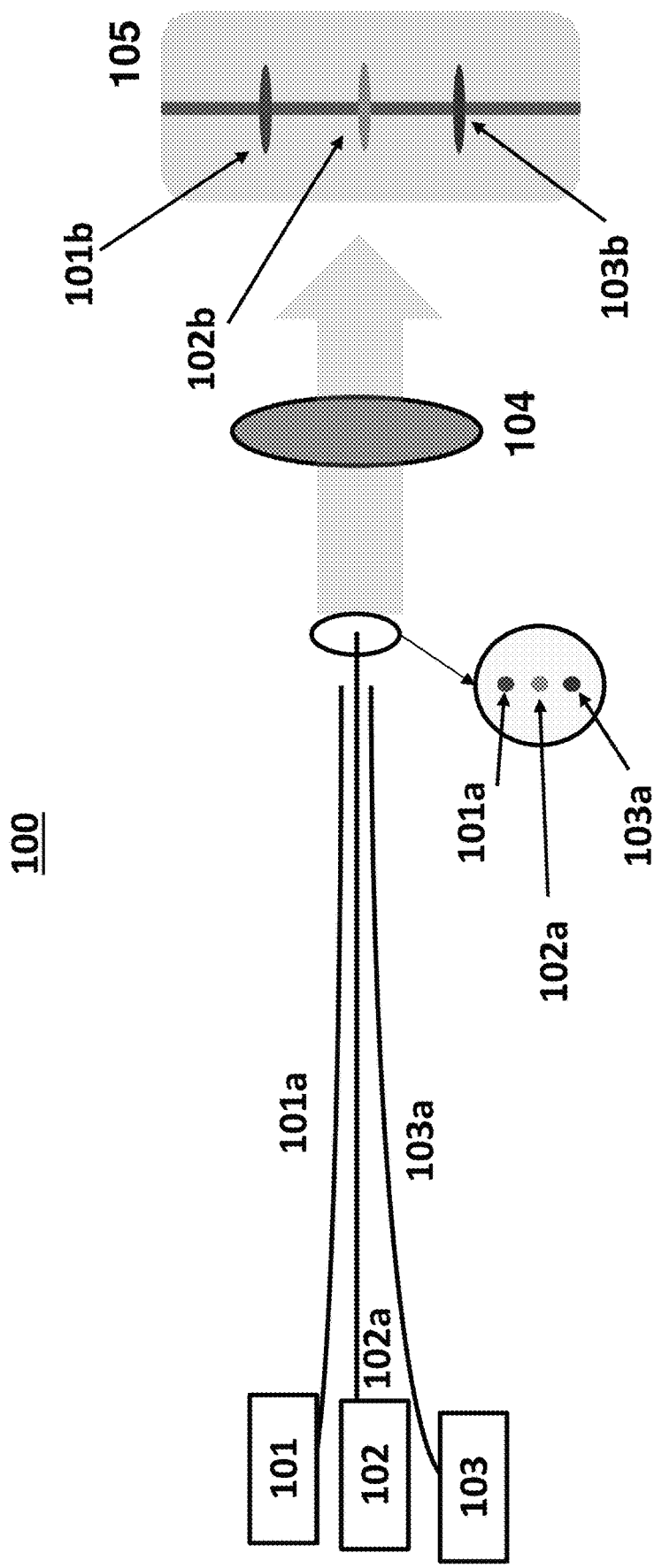
FIG. 1A depicts a light source having a plurality of lasers and a light propagation component that includes operably coupled fiber optics according to certain embodiments.

Aspects of the disclosure include systems for irradiating a sample in a flow stream. Systems according to certain embodiments include a light propagator having a first fiber optic operably coupled to a first laser and configured to receive light from the first laser at a proximal end and to convey the laser light from a distal end to a first position on the flow stream and a second fiber optic operably coupled to a second laser and configured to receive light from the second laser at a proximal end and to convey the laser light from a distal end to a second position on the flow stream. Methods for irradiating a sample in a flow stream with the subject systems and detecting light from two or more positions on irradiated flow stream are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides systems and methods for irradiating particles in a flow stream. In further describing embodiments of the disclosure, systems having a light source with two or more lasers and a light propagator are first described in greater detail. Next, methods for irradiating a sample in a flow stream and detecting light from particles in the flow stream are described. Kits having one or more components of the subject systems are also provided.

Systems for Irradiating Particles in a Flow Stream

Aspects of the disclosure include systems for irradiating particles in a flow stream. In embodiments, systems include a light source having two or more lasers and a light propagator having fiber optics for receiving light from the lasers and conveying laser light to different positions on a flow stream. In some embodiments, the light source is configured to provide for continuous irradiation of the flow stream with laser light. As described herein, the term "continuous" is used herein in its conventional sense to refer to irradiation of the flow stream with laser light which is constant and not otherwise interrupted for the duration that a sample of interest is flowed through the flow stream. In some embodiments, laser light conveyed to the flow stream from the light propagation component (as described in greater detail below) is unobscured (i.e., not intermittently blocked with a beam stop or obscuration component). In some embodiments, light sources of interest include 1 or more lasers configured to provide laser light for continuous irradiation of the flow stream, such as 2 lasers or more configured to provide laser light for continuous irradiation of the flow stream, such as 3 lasers or more, such as 4 lasers or more, such as 5 lasers or more, such as 10 lasers or more, such as 15 lasers or more, such as 25 lasers or more and including 50 lasers or more configured to provide laser light for continuous irradiation of the flow stream.

In certain instances, the light source is configured to maintain a constant laser light intensity that is conveyed from the light propagation component to the flow stream, such as a laser light intensity that changes by 5% or less for the duration that a sample of interest is flowed through the flow stream, such as by 4% or less, such as by 3% or less, such as by 2% or less, such as by 1% or less, such as by 0.5% or less, such as by 0.1% or less, such as by 0.01% or less, such as by 0.001% or less and including a laser irradiation intensity that changes by 0.0001% or less. In certain embodiments, the laser light conveyed from the light propagation component to the flow stream exhibits no change in intensity for the duration that a sample is flowed through the flow stream. The intensity of laser light output from the light propagation component for continuous irradiation can be measured with any convenient protocol, including but not limited to, a scanning slit profiler, a charge coupled device (CCD, such as an intensified charge coupled device, ICCD), a positioning sensor, power sensor (e.g., a thermopile power sensor), optical power sensor, energy meter, digital laser photometer, a laser diode detector, among other types of photodetectors.

Lasers configured to provide laser light for continuous irradiation may vary and may independently be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In others instances, the laser configured for continuous irradiation is a dye laser, such as a stilbene, coumarin or rhodamine laser. In yet other instances, lasers configured for continuous irradiation of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, systems include a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulium YAG laser, ytterbium YAG laser, ytterbium$_2$O$_3$ laser or cerium doped lasers and combinations thereof. In still other instances, systems include a semiconductor diode laser, optically pumped semiconductor laser (OPSL), or a frequency doubled- or frequency tripled implementation of any of the above-mentioned lasers. The lasers may include any combination of types of lasers. For example, in some embodiments, the subject systems include an array of lasers, such as an array having one or more gas lasers, one or more dye lasers and one or more solid-state lasers. In certain embodiments, lasers configured to provide laser light for continuous irradiation of the flow stream include an array of continuous wave lasers, such as continuous wave diode lasers.

Depending on the desired wavelengths of light for irradiating the flow stream, each laser may have a specific wavelength that varies from 200 nm to 1500 nm, such as from 250 nm to 1250 nm, such as from 300 nm to 1000 nm, such as from 350 nm to 900 nm and including from 400 nm to 800 nm. In certain embodiments, lasers of interest may include one or more of a 405 nm laser, a 488 nm laser, a 561 nm laser and a 635 nm laser.

In some embodiments, the light source is configured to provide laser light for irradiating the flow stream in discrete intervals. The term "discrete interval" is used herein in its conventional sense to refer to laser irradiation of the flow stream for a predetermined duration of time followed by a period of time where the flow stream is not irradiated by the laser (e.g., by turning off the laser or by blocking light laser conveyed from the light propagation component such as with a chopper, beam stop, etc.). In some embodiments, laser light from the light propagation component is conveyed to the flow stream in discrete intervals of 0.001 µs or more, such as for 0.005 µs or more, such as for 0.01 µs or more, such as for 0.05 µs or more, such as for 0.1 µs or more, such as for 0.5 µs or more, such as for 1 µs or more, such as for 5 µs or more, such as for 10 µs or more, such as for 50 µs or more, such as for 100 µs or more and including for 500 µs or more. In certain instances, laser light from the light propagation component is conveyed to the flow stream in discrete intervals of from 0.0001 µs to 500 ms, such as from 0.0005 µs to 250 ms, such as from 0.001 µs to 50 ms, such as from 0.005 µs to 5 ms, such as from 0.01 µs to 1000 µs, such as from 0.05 to 750 µs, such as from 0.1 µs to 500 µs, such as from 0.5 µs to 250 µs, such as from 1 µs to 100 µs and including from 10 µs to 100 µs. The duration between each discrete interval may be 0.001 µs or more, such as 0.005 µs or more, such as 0.01 µs or more, such as 0.05 µs or more, such as 0.1 µs or more, such as 0.5 µs or more, such as 1 µs or more, such as 5 µs or more, such as 10 µs or more, such as 50 µs or more, such as 100 µs or more and including 500 µs or more. For example, the duration between each discrete interval may range from 0.0001 µs to 500 ms, such as from 0.0005 µs to 250 ms, such as from 0.001 µs to 50 ms, such as from 0.005 µs to 5 ms, such as from 0.01 µs to 1000 µs, such as from 0.05 to 750 µs, such as from 0.1 µs to 500 µs, such as from 0.5 µs to 250 µs, such as from 1 µs to 100 µs and including from 10 µs to 100 µs.

In some embodiments, light sources of interest include 1 or more lasers configured to provide laser light for discrete irradiation of the flow stream, such as 2 lasers or more, such as 3 lasers or more, such as 4 lasers or more, such as 5 lasers or more, such as 10 lasers or more, such as 15 lasers or more, such as 25 lasers or more and including 50 lasers or more configured to provide laser light for discrete irradiation of the flow stream. To irradiate the flow stream in discrete intervals, each laser is operationally coupled to the light propagation component to provide for intermittent irradiation of the flow stream with each laser. Any convenient protocol can be used to provide intermittent laser light, such as an electronic switch for turning the laser on-and-off, such as a switch that is computer-controlled and triggered based on a data signal (e.g., received or inputted data signal). In other embodiments, the light source is configured to irradiate the flow stream with discrete intervals of laser light by intermittently exposing the laser light conveyed from the light propagation component to a beam chopper or beam stop.

Lasers configured to provide laser light for irradiation in discrete intervals may vary and may independently be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In others instances, the laser configured for continuous irradiation is a dye laser, such as a stilbene, coumarin or rhodamine laser. In yet other instances, lasers configured for continuous irradiation of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, systems include a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulium YAG laser, ytterbium YAG laser, ytterbium$_2$O$_3$ laser or cerium doped lasers and combinations thereof. In still other instances, systems include a semiconductor diode laser, optically pumped semiconductor laser (OPSL), or a frequency doubled- or frequency tripled implementation of any of the above-mentioned lasers. The lasers may include any combination of types of lasers. For example, in some embodiments, the subject systems include an array of lasers, such as an array having one or more gas lasers, one or more dye lasers and one or more solid-state lasers. In certain embodiments, lasers configured to provide laser light for irradiation of the flow stream in discrete intervals include an array of continuous wave lasers, such as continuous wave diode lasers.

Depending on the desired wavelengths of light for irradiating the flow stream, each laser may have a specific wavelength that varies from 200 nm to 1500 nm, such as from 250 nm to 1250 nm, such as from 300 nm to 1000 nm, such as from 350 nm to 900 nm and including from 400 nm to 800 nm. In certain embodiments, lasers of interest may include one or more of a 405 nm laser, a 488 nm laser, a 561 nm laser and a 635 nm laser.

In embodiments, the light source includes a light propagator for conveying laser light from each laser to the flow stream. In some embodiments, the light propagation component includes a fiber optic operably coupled to each laser to convey laser light from each laser to a different position on the flow stream. Depending on the number of lasers in the light source, the light propagation component may include 2 or more fiber optics, such as 3 or more fiber optics, such as 4 or more fiber optics, such as 5 or more fiber optics, such as 6 or more fiber optics, such as 7 or more fiber optics, such as 8 or more fiber optics, such as 9 or more fiber optics, such as 10 or more fiber optics, such as 25 or more fiber optics, such as 50 or more fiber optics and including 100 or more fiber optics. In certain embodiments, the light propagation component includes one or more fiber optic bundles, such as 2 or more fiber optic bundles, such as 3 or more fiber optic bundles, such as 4 or more fiber optic bundles and including 5 or more fiber optic bundles. In some embodiments, each laser is operably coupled to a single fiber optic. In other embodiments, each laser is operably coupled to more than one fiber optic, such as where each laser is operably coupled to 2 or more fiber optics, such as 3 or more fiber optics, such as 4 or more fiber optics, such as 5 or more fiber optics, such as 6 or more fiber optics, such as 7 or more fiber optics, such as 8 or more fiber optics, such as 9 or more fiber optics, such as 10 or more fiber optics, such as 25 or more fiber optics, such as 50 or more fiber optics and including 100 or more fiber optics. For example, the ratio of laser to fiber optics in the light propagation component may be 1:2 or more, such as 1:3 or more, such as 1:4 or more, such as 1:5 or more, such as 1:6 or more, such as 1:7 or more, such as 1:8 or more, such as 1:9 or more, such as 1:10 or more, such as 1:25 or more, such as 1:50 or more and including a ratio of laser to fiber optics of 1:100 or more.

Each fiber optic operably coupled to the lasers may be a single mode fiber optic or a multimode fiber optic. In some embodiments, each laser is operably coupled to a single mode fiber optic. In other embodiments, each laser is operably coupled to a multi-mode fiber optic. In yet other embodiments, one or more lasers are operably coupled to a single mode fiber optic and one or more lasers are operably coupled to a multi-mode fiber optic. In certain embodiments, each laser is operably coupled to two or more fiber optics. In one example, each laser is operably coupled to two or more single mode fiber optics. In another example, each laser is operably coupled to two or more multi-mode fiber optic. In still another example, each laser is operably coupled to one or more single mode fiber optic and one or more multi-mode fiber optic.

In some embodiments, the light propagation component includes one or more fiber optic bundles. Where the light propagation component includes one or more fiber optic bundles, the lasers may be operably coupled to a single mode fiber optic bundle or a multi-mode fiber optic bundle. In some instances, each laser is operably coupled to a single mode fiber optic bundle. In other instances, each laser is operably coupled to a multi-mode fiber optic bundle. In yet other instances, one or more lasers are operably coupled to a single mode fiber optic bundle and one or more lasers are operably coupled to a multi-mode fiber optic bundle.

FIG. 1A depicts a light source having a plurality of lasers and a light propagation component that includes operably coupled fiber optics according to certain embodiments. Light source 100 includes a first laser 101 operably coupled to fiber optic 101a, a second laser 102 operably coupled to fiber optic 102a and a third laser 103 operably coupled to fiber optic 103a. The distal ends of fiber optics 101a, 102a and 103a are imaged onto flow stream 104 through imaging optics 104 and form beam spots 101b, 102b and 103b which irradiate at different positions downstream from each other on flow stream 105.

Depending on the position and pattern of irradiation of the flow stream by the laser light, the arrangement at the distal end of the fiber optics in the light propagation component may vary. In some embodiments, the fiber optics may be arranged at the distal end of the light propagation component in a cross-sectional shape such as a rectilinear cross-sectional shape, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, the distal end of the fiber optics of the light propagation component is arranged in a line pattern. In some instances, the distal end of the fiber optics of the light propagation component are arranged in a line pattern that is parallel to the longitudinal axis of the flow stream (i.e., parallel to the direction of sample flow).

In other instances, the distal end of the fiber optics of the light propagation component are arranged in a line pattern that is orthogonal to the longitudinal axis of the flow stream (i.e., arranged to convey laser light across a horizontal axis of the flow stream). The distance between the distal end of each fiber optic (e.g., when arranged in a line pattern) may be 0.0001 mm or more, such as 0.0005 mm or more, such as 0.001 mm or more, such as 0.005 mm or more, such as 0.01 mm or more, such as 0.05 mm or more, such as 0.1 mm or more, such as 0.2 mm or more, such as 0.3 mm or more, such as 0.5 mm or more, such as 0.6 mm or more, such as 0.7 mm or more, such as 0.8 mm or more, such as 0.9 mm or more, such as 1.0 mm or more, such as 2 mm or more and including 3 mm or more. In some embodiments, the distance between the distal end of each fiber optic ranges from 0.0001 mm to 5 mm, such as from 0.0005 mm to 4.5 mm, such as from 0.001 mm to 4.0 mm, such as from 0.005 mm to 3.5 mm, such as from 0.01 mm to 3.0 mm, such as from 0.05 mm to 2.5 mm, such as from 0.1 mm to 2.0 mm and including from 0.2 mm to 1.5 mm.

Figure 1B:
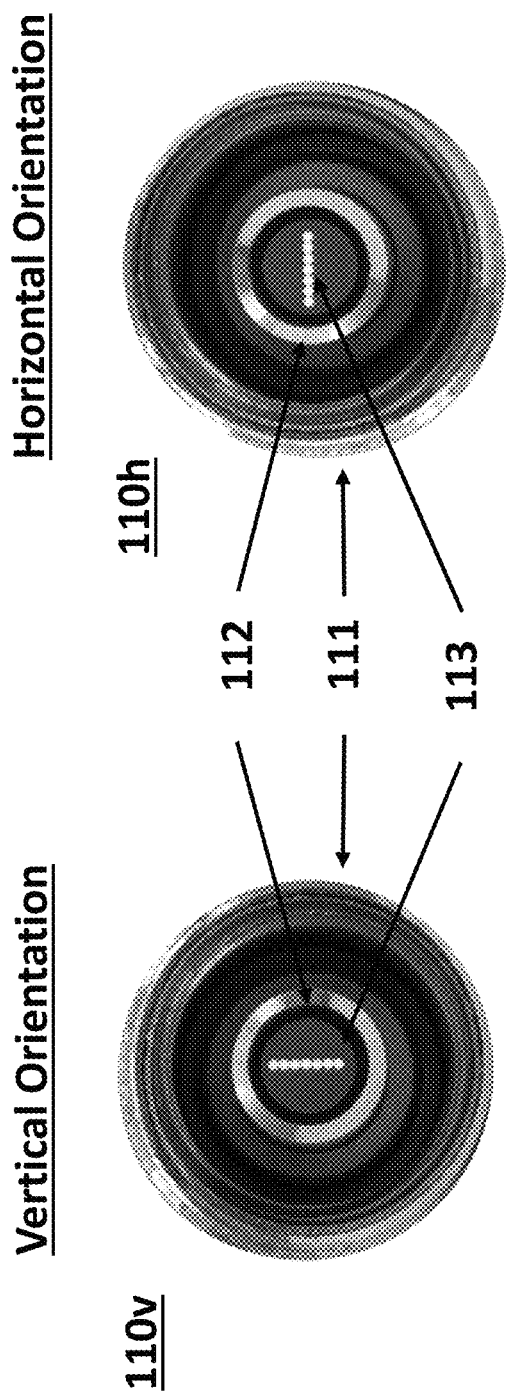
FIG. 1B depicts a linear arrangement of fiber optics at the distal end of a light propagation component according to certain embodiments.

FIG. 1B depicts a linear arrangement of fiber optics at the distal end of a light propagation component according to certain embodiments. Light propagation component 110 includes an outer housing 111 and inner core 102 having seven fiber optics 113 which are positioned at the distal end in a linear arrangement. In some embodiments, light propagation component 110 is oriented such that fiber optics 113 are aligned along a horizontal axis (110h) and configured to irradiate across a horizontal axis of the flow stream. In other embodiments, light propagation component 110 is oriented such that fiber optics 113 are aligned along a vertical axis (110v) and configured to irradiate along the longitudinal axis of the flow stream (i.e., along the direction of fluidic flow in the flow cell).

In embodiments, the light propagation component is configured to convey light to different positions on a flow stream. For example, the light propagation component may be configured to convey light onto the flow stream based on arrangement of the distal end of the fiber optics. In some embodiments, the light propagation component is configured to convey laser light onto a flow stream in a predetermined pattern, such as a pattern having a rectilinear cross-sectional shape, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, the light propagation component is configured to convey light onto the flow stream in a linear pattern. In some instances, the light propagation component is configured to convey light onto the flow stream in a linear pattern that is parallel to the longitudinal axis of the flow stream (i.e., parallel to the direction of sample flow). In other instances, the light propagation component is configured to convey light onto the flow stream in a linear pattern that is orthogonal to the longitudinal axis of the flow stream (i.e., across a horizontal axis of the flow stream). The distance between the positions of irradiation on the flow stream by light conveyed by each fiber optic (e.g., when arranged in a line pattern) may be 0.0001 mm or more, such as 0.0005 mm or more, such as 0.001 mm or more, such as 0.005 mm or more, such as 0.01 mm or more, such as 0.05 mm or more, such as 0.1 mm or more, such as 0.2 mm or more, such as 0.3 mm or more, such as 0.5 mm or more, such as 0.6 mm or more, such as 0.7 mm or more, such as 0.8 mm or more, such as 0.9 mm or more, such as 1.0 mm or more, such as 2 mm or more and including 3 mm or more. In some embodiments, the distance between the position of irradiation on the flow stream by light conveyed by each fiber optic ranges from 0.0001 mm to 5 mm, such as from 0.0005 mm to 4.5 mm, such as from 0.001 mm to 4.0 mm, such as from 0.005 mm to 3.5 mm, such as from 0.01 mm to 3.0 mm, such as from 0.05 mm to 2.5 mm, such as from 0.1 mm to 2.0 mm and including from 0.2 mm to 1.5 mm.

In some embodiments, the light propagation component is configured to convey light from a first fiber optic to a first position on the flow stream and to convey light from a second fiber optic to a second position on the flow stream. In some instances, the second position is downstream from the first position on the flow stream. For example, the second position may be 0.0001 mm or more downstream from the first position on the flow stream, such as 0.0005 mm or more, such as 0.001 mm or more, such as 0.005 mm or more, such as 0.01 mm or more, such as 0.05 mm or more, such as 0.1 mm or more, such as 0.2 mm or more, such as 0.3 mm or more, such as 0.5 mm or more, such as 0.6 mm or more, such as 0.7 mm or more, such as 0.8 mm or more, such as 0.9 mm or more, such as 1.0 mm or more, such as 2 mm or more and including 3 mm or more downstream from the first position on the flow stream. In some instances, the second position is downstream from the first position on the flow stream by a distance that ranges from 0.0001 mm to 5 mm, such as from 0.0005 mm to 4.5 mm, such as from 0.001 mm to 4.0 mm, such as from 0.005 mm to 3.5 mm, such as from 0.01 mm to 3.0 mm, such as from 0.05 mm to 2.5 mm, such as from 0.1 mm to 2.0 mm and including from 0.2 mm to 1.5 mm. In certain embodiments, the second position is 0.2 mm or more downstream from the first position on the flow stream.

In embodiments, the generated output beams of light from the distal end of each of the fiber optics retain the power intensity of each laser, such that power from each laser is reduced by 10% or less, such as 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.01% or less, such as by 0.001% or less and including by 0.0001% or less after propagating through the fiber optics of the light propagation component. The generated output power of beams of light from the distal end of each fiber optic according to embodiments can be determined by any convenient protocol, including but not limited to, measuring the incident and output power with a power sensor (e.g., a thermopile power sensor), optical power sensor, energy meter, digital laser photometer, a laser diode detector, a CCD or CMOS photosensor, among other types of photodetectors. To determine the change in power, light from one or more of the fiber optics may be measured with one or more of the aforementioned power meters, such as with a handheld optical or thermopile power meter and compared with the generated laser power.

In some embodiments, the light propagation component includes an optical adjustment component that is in optical communication with a distal end of one or more of the fiber optics of the light propagation component. The term "optical adjustment" is used herein in its conventional sense to refer to any device that is capable of changing the spatial width or some other characteristic of the light conveyed from the distal end of each fiber optic of the light propagation component, such as for example, irradiation direction, wavelength, beam width, beam intensity, focal point and pulse width. Optical adjustment protocols may be any convenient device, including but not limited to lenses, mirrors, filters, fiber optics, wavelength separators, pinholes, slits, collimating protocols and combinations thereof. In certain embodiments, the light propagation component includes one or more focusing lenses. The focusing lens, in one example may be a de-magnifying lens. In another example, the focusing lens is a magnifying lens. In other embodiments, the light propagation component includes one or more mirrors.

In some instances, each optical adjustment component is affixed to the distal end of the light propagation component. In other instances, each optical adjustment component is co-molded to the distal end of the light propagation component. In still other instances, each optical adjustment component is physically distanced but in optical communication with the distal end of each fiber optic. In these instances, each optical adjustment component may be positioned 0.0001 mm or more from the distal end of the fiber optic, such as 0.0005 mm or more, such as 0.001 mm or more, such as 0.005 mm or more, such as 0.01 mm or more, such as 0.05 mm or more, such as 0.1 mm or more, such as 0.2 mm or more, such as 0.3 mm or more, such as 0.5 mm or more, such as 0.6 mm or more, such as 0.7 mm or more, such as 0.8 mm or more, such as 0.9 mm or more, such as 1.0 mm or more, such as 2 mm or more and including 3 mm or more from the distal end of the fiber optic.

In certain embodiments, the optical adjustment component is a beam-shaping component configured to generate a predetermined beam profile that is conveyed to the flow stream. The term "beam shaping" is used herein in its conventional sense to mean that the beam profile of the light conveyed from each of the fiber optics along one or more of the horizontal axis and vertical axis is changed as desired. The beam shaping component may be configured to generate a beam of light having a predetermined intensity profile along one or more of a horizontal axis and a vertical axis. In some embodiments, the beam shaping component is configured to generate an output beam of light having a beam profile with an intensity at the center that is from 75% to 99.9% of the intensity at the edges along one or more of the horizontal axis and the vertical axis. In some embodiments, the beam shaping component is configured to generate an output beam of light having a beam profile with a substantially constant intensity from each edge to the center, such as where the intensity across the horizontal axis of the beam profile varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.05% or less, such as by 0.01% or less and including where the intensity across the horizontal axis of the beam profile varies by 0.001% or less. In other embodiments, the beam shaping component is configured to generate an output beam of light having a beam profile with a substantially constant intensity from each edge to the center, such as where the intensity across the vertical axis of the beam profile varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.05% or less, such as by 0.01% or less and including where the intensity across the vertical axis of the beam profile varies by 0.001% or less.

In certain embodiments, the beam shaping component is configured to generate an output beam of light from one or more of the fiber optics in the light propagation component having a top hat intensity profile along the horizontal axis. The term "top hat" is used herein in its conventional sense to refer to a beam of irradiation (e.g., light) having near uniform fluence (energy density) along one or more axes orthogonal to the optical axis of the beam of irradiation. In embodiments, output beams of light having a top hat intensity profile exhibit little to no deviation in relative intensity from each edge to the center along the horizontal axis, where beams of light having a top hat intensity profile of interest have an intensity at the center that is from 95% to 99.9% of the intensity at the edges along the horizontal axis, such as 96% to 99.5% and including from 98% to 99% of the intensity at the edges along the horizontal axis.

In other embodiments, the beam shaping component is configured to generate an output beam of light from one or more of the fiber optics in the light propagation component having a super Gaussian intensity profile along the horizontal axis. The term "super Gaussian" is used herein in its conventional sense to refer to a beam of irradiation having an energy density that is slightly greater at the center of the beam profile along one or more axes orthogonal to the optical axis of the beam of irradiation. In embodiments, output beams of light having a super Gaussian intensity profile exhibit greater fluence at the edges of the beam along the horizontal axis than a corresponding Gaussian intensity profile. In one example, beams of light having a super Gaussian intensity profile have an intensity at the edges that is from 70%-90% of the intensity at the center of the beam along the horizontal axis, such as from 75%-85% and including an intensity at the edges that is from 80%-90% of the intensity at the center of the beam along the horizontal axis.

In light propagation components described herein, the beam shaping component may be any convenient beam shaper that modifies the beam profile of a light beam across one or more of the horizontal axis and the vertical axis. As described herein, the horizontal and vertical axis refer to the axes that are orthogonal to the optical axis (i.e., beam path) of the beam of light and in embodiments, form the X-Y plane of the beam profile. The horizontal axis of output beams of light is orthogonal to the longitudinal axis of the flow stream (e.g., a flow stream in a flow cytometer) and the vertical axis of output beams of light is parallel to the longitudinal axis of the flow stream. In some embodiments, the beam shaping component of interest modifies the beam profile of a propagated light beam across the horizontal axis. In other embodiments, the beam shaping component of interest modifies the beam profile of a propagated light beam across the vertical axis. In yet other embodiments, the beam shaping component of interest modifies the beam profile of a propagated light beam across the horizontal axis and the vertical axis. The beam shaping component in these embodiments may include diffractive optics, refractive optics or an array of lenses, such as a cylindrical lens array. In some embodiments, the optical adjustment component includes a biconic lens. In other embodiments, the optical adjustment component includes an achromatic optical assembly configured to image a distal end of each fiber optic onto the flow stream. In certain embodiments, the optical adjustment component is a beam shaping component that includes an aspheric cylindrical lens having cylindrical axes oriented at right angles, such as a laser line generator lens (e.g., a Powell lens). Examples of laser line generator lenses include, but are not limited to, those described in U.S. Pat. Nos. 4,826,299; 5,283,694; 7,400,457 and 7,329,860, the disclosures of which are herein incorporated by reference.

In some embodiments, the optical adjustment component is configured to image the distal end of the light propagation component onto the flow stream. In some instances, the optical adjustment component includes magnifying optics for conveying a magnified image of the distal end of each fiber optic in the light propagation component onto the flow stream. For example, the optical adjustment component may include one or more magnifying optics that provide for 1.1× magnification or greater, such as 1.2× magnification or greater, such as 1.3× magnification or greater, such as 1.4× magnification or greater, such as 1.5× magnification or greater, such as 1.6× magnification or greater, such as 1.7× magnification or greater, such as 1.8× magnification or greater, such as 1.9× magnification or greater, such as 2× magnification or greater, such as 2.5× magnification or greater, such as 3× magnification or greater, such as 3.5× magnification or greater, such as 4× magnification or greater, such as 4.5× magnification or greater and including magnifying optics that provide for 5× magnification or greater imaging of the distal end of the fiber optics of the light propagation component onto the flow stream. In certain embodiments, the optical adjustment component provides for magnification of the image of the distal end of the fiber optics of the light propagation component onto the flow stream by 1.1× to 10× magnification, such as from 1.2× to 9×, such as from 1.3× to 8×, such as from 1.4× to 7×, such as from 1.5× to 6×, such as from 1.6× to 5×, such as from 1.7× to 4×, such as from 1.8× to 3× and including from 1.9× to 2.5× magnification. In certain embodiments, the distal end of the fiber optics of the light propagation is imaged at 1.6× magnification onto the flow stream.

Figure 2A:
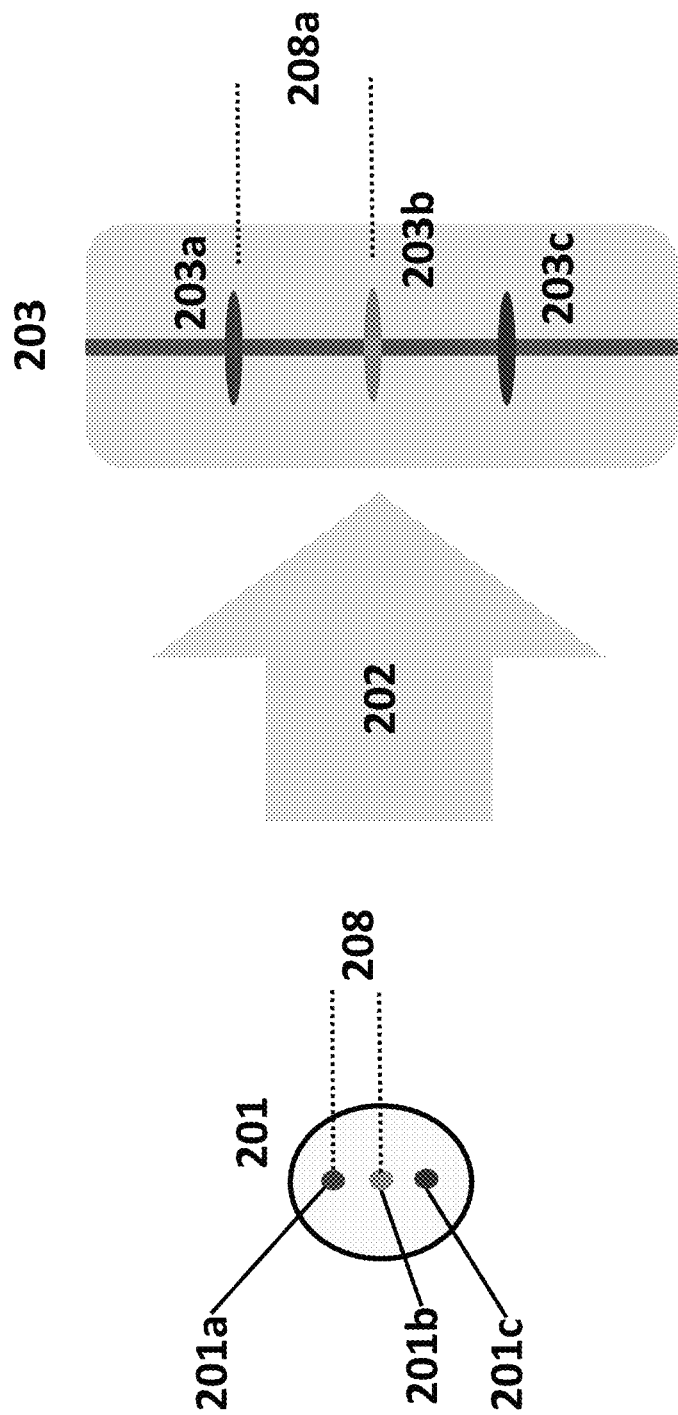
FIG. 2A depicts magnified imaging of the distal end of the fiber optics of the light propagation component onto a flow stream according to certain embodiments.

FIG. 2A depicts magnified imaging of the distal end of the fiber optics of the light propagation component onto a flow stream according to certain embodiments. The distal end of light propagation component 201 includes fiber optics 201a, 201b and 201c. In one embodiment according to FIG. 2A, the distal end of fiber optic 201a has a diameter of 3.5 µm, the distal end of fiber optic 201b has a diameter of 4.0 µm and the distal end of fiber optic 201C has a diameter of 5.5 µm. Fiber optics 201a, 201b and 201c are spaced apart from each other by a distance 208, in one embodiment being about 125 µm. The distal end of light propagation component 201 is magnified onto flow stream 203 through magnifying optics 202, for example in one embodiment a 1.6× magnification. Beamspots 203a, 203b and 203c have beam profiles along a horizontal axis of the flow stream (i.e., orthogonal to flow direction). Beamspots 203a, 203b and 203c are separated from each other by a distance 208a, in one embodiment being about 200 μm (e.g., 1.6× of distance 208).

In embodiments, the beams of light conveyed through the optical adjustment component retain the power intensity of propagated from the distal end of each fiber optic, such that power from the beam of light from each fiber optic is reduced by 10% or less, such as 9% or less, such as by 8% or less, such as by 7% or less, such as by 6% or less, such as by 5% or less, such as by 4% or less, such as by 3% or less, such as by 2% or less, such as by 1% or less, such as 0.5% or less, such as by 0.1% or less, such as by 0.01% of less, such as by 0.001% or less and including by 0.0001% or less.

Optical adjustment components of interest (e.g., biconic lens, achromatic optical assembly, cylindrical lens, laser line generator lens, Powell lens) may be formed from any suitable material including but not limited to glass (e.g., N-SF10, N-SF11, N-SF57, N-BK7, N-LAK21 or N-LAF35 glass), silica (e.g., fused silica), quartz, crystal (e.g., $CaF_2$ crystal), zinc selenide (ZnSe), $F_2$, germanium (Ge) titanate (e.g., S-TIH11), borosilicate (e.g., BK7). In some embodiments, the beam shaping component has a transparency window of from 150 nm to 5 μm; from 180 nm to 8 μm, from 185 nm to 2.1 μm, from 200 nm to 6 μm, from 200 nm to 11 μm, from 250 nm to 1.6 μm, from 350 nm to 2 μm, from 600 nm to 16 μm, from 1.2 m to 8 μm, from 2 m to 16 m or some other wavelength range. The refractive index of optical adjustment components of interest may vary, ranging from 1 to 3, such as from 1.1 to 2.9, such as from 1.2 to 2.8, such as from 1.3 to 2.7, such as from 1.4 to 2.6, such as from 1.5 to 2.7, such as from 1.6 to 2.6, such as from 1.7 to 2.5, such as from 1.8 to 2.4 and including from 1.9 to 2.3.

In certain embodiments, the distal end of one or more of the fiber optics of the light propagation component is shaped to generate a predetermined beam profile on the flow stream for each beam of laser light. In some instances, one or more of the fiber optics has a distal end having a shape that is configured to generate a substantially constant beam profile across a horizontal axis of the flow stream for each beam of laser light. For example, the distal end of the fiber optic may be shaped to generate an output beam of light having a beam profile having an intensity at the center that is from 75% to 99.9% of the intensity at the edges along one or more of the horizontal axis and the vertical axis. In some embodiments, the distal end of the fiber optic is shaped to generate an output beam of light having a beam profile having a substantially constant intensity from each edge to the center, such as where the intensity across the horizontal axis of the beam profile varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.05% or less, such as by 0.01% or less and including where the intensity across the horizontal axis of the beam profile varies by 0.001% or less. In other embodiments, the distal end of the fiber optic is shaped to generate an output beam of light having a beam profile having a substantially constant intensity from each edge to the center, such as where the intensity across the vertical axis of the beam profile varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.05% or less, such as by 0.01% or less and including where the intensity across the vertical axis of the beam profile varies by 0.001% or less. In certain embodiments, the distal end of one or more of the fiber optics is shaped to generate an output beam of light having a top-hat beam profile.

In some embodiments, the distal end of one or more fiber optics of the light propagation component has a cross-sectional shape such as a rectilinear cross-sectional shape, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In some embodiments, the distal end of one or more fiber optics in the light propagation component has a polygonal cross-section. In other embodiments, the distal end of one or more fiber optics in the light propagation component has a square cross-section. In yet other embodiments, the distal end of one or more fiber optics in the light propagation component has a rectangular cross-section.

Figure 2B:
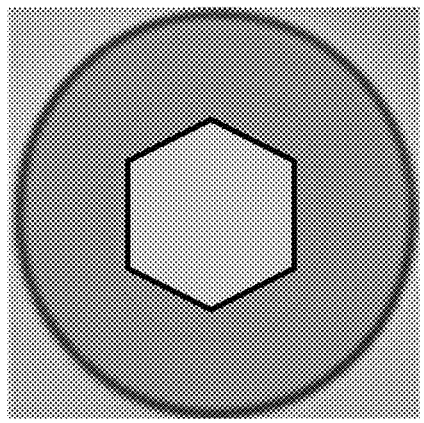
FIG. 2B depicts the distal end of fiber optics configured to generate a predetermined beam profile according to certain embodiments.
Figure 2B:
Figure 2B:
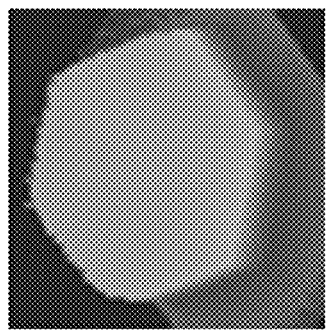
Figure 2B:
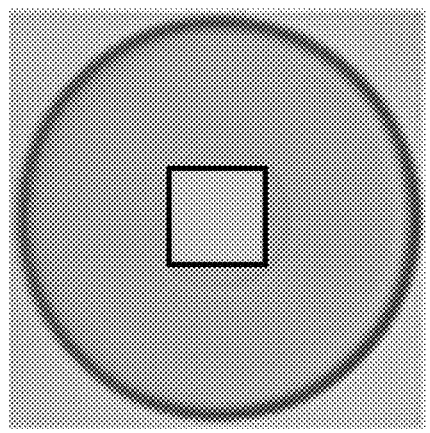
Figure 2B:
Figure 2B:
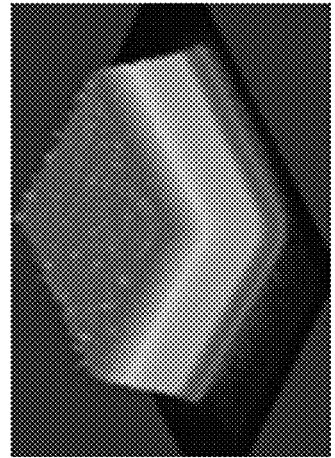

FIG. 2B depicts the distal end of fiber optics configured to generate a predetermined beam profile according to certain embodiments. Fiber optic 210 has a distal end with a square cross-sectional shape and is configured to generate square-shaped beam profile, 211. Fiber optic 220 has a distal end with a hexagonal cross-sectional shape and is configured to generate a hexagonal beam profile, 221.

In some embodiments, light from the flow stream (e.g., light from particles in the flow stream) irradiated with the subject light sources are conveyed to a light detection system. Light detection systems may include one or more photodetectors. Photodetectors in the subject systems may be any convenient light detecting protocol, including but not limited to photosensors or photodetectors, such as active-pixel sensors (APSs), quadrant photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. The light detection system for measuring light from the flow stream may include 1 photodetector or more, such as 2 photodetectors or more, such as 3 photodetectors or more, such as 4 photodetectors or more, such as 5 photodetectors or more, such as 10 photodetectors or more, such as 25 photodetectors or more and including 50 photodetectors or more.

In certain embodiments, the systems of interest include a photodiode array having more than one photodiode, such as two or more photodiodes, such as three or more, such as five or more and including 10 or more photodiodes, where each photodiode may have an active detecting surface area of each region that ranges from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

In embodiments of the present disclosure, photodetectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light from particles in the flow stream at 400 or more different wavelengths.

In embodiments, the photodetectors are configured to measure light continuously or in discrete intervals. In some instances, detectors of interest are configured to take measurements of the collected light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Each photodetector may be positioned at any suitable distance from the flow stream so long as a usable light signal is detectable. For example, detectors in the subject systems may be positioned 1 mm or more from the flow stream, such as 5 mm or more, such as 10 mm or more, such as 15 mm or more, such as 25 mm or more, such as 50 mm or more, such as 100 mm or more, such as 150 mm or more, such as 250 mm or more and including 500 mm or more from the flow stream. The detectors may also be positioned at any angle from the flow stream. For example, the detectors may be angled with respect to the vertical axis of the flow stream at from 10° to 90°, such as from 15° to 85°, such as from 20° to 80°, such as from 25° to 75° and including from 30° to 60°. In some instances, the one or more detectors are positioned at 30° to 60° with respect to the vertical axis of the flow stream.

In embodiments, systems are configured to detect forward scattered light, side scattered light, emitted light, transmitted light or a combination thereof. In certain embodiments, the light signals from the irradiated flow stream may be detected by one or more detectors configured as forward scatter detectors. In these embodiments, the forward scatter detectors are positioned on the opposite side of the flow stream from the light source and are positioned to collect and detect forward propagated (e.g., scattered) light. In certain embodiments, systems include a single photodetector that is configured to detect light from the flow stream. In these embodiments, the photodetector detects light from particles in the flow stream that are irradiated with light from the light propagation component.

In some embodiments, systems include an optical collection system for collecting and directing light from the flow stream to the light detection system. The optical collection system may be physically coupled to the light detection system, such as with an adhesive, co-molded together or integrated into the light detection system. In certain embodiments, the optical collection system and the light detection system are integrated into a single unit. In other embodiments, the optical collection system is coupled to the light detection system with an connector, such as with a hook and loop fasteners, magnets, latches, notches, countersinks, counter-bores, grooves, pins, tethers, hinges, Velcro, non-permanent adhesives or a combination thereof.

In other embodiments, the light detection system and the optical collection system are in optical communication, but are not physically in contact. For example, the optical collection system may be positioned 0.001 mm or more from the light detection system, such as 0.005 mm or more, such as 0.01 mm or more, such as 0.05 mm or more, such as 0.1 mm or more, such as 0.5 mm or more, such as 1 mm or more, such as 10 mm or more, such as 25 mm or more, such as 50 mm or more and including 100 mm or more from the light detection system.

In some embodiments, the optical collection system includes fiber optics. For example, in some instances the optical collection system may be a fiber optics light relay bundle and light is conveyed through the fiber optics light relay bundle to the light detection system. In some instances, the optical collection system includes 2 or more fiber optics, such as 3 or more fiber optics, such as 4 or more fiber optics, such as 5 or more fiber optics, such as 6 or more fiber optics, such as 7 or more fiber optics, such as 8 or more fiber optics, such as 9 or more fiber optics, such as 10 or more fiber optics, such as 25 or more fiber optics, such as 50 or more fiber optics and including 100 or more fiber optics. In certain embodiments, the optical collection system includes one or more fiber optic bundles, such as 2 or more fiber optic bundles, such as 3 or more fiber optic bundles, such as 4 or more fiber optic bundles and including 5 or more fiber optic bundles.

In some embodiments, each beam spot on the flow stream is operably coupled to a single fiber optic in the optical collection system. In other embodiments, each beam spot on the flow stream is operably coupled to more than one fiber optic in the optical collection system, such as where each beam spot on the flow stream is operably coupled to 2 or more fiber optics, such as 3 or more fiber optics, such as 4 or more fiber optics, such as 5 or more fiber optics, such as 6 or more fiber optics, such as 7 or more fiber optics, such as 8 or more fiber optics, such as 9 or more fiber optics, such as 10 or more fiber optics, such as 25 or more fiber optics, such as 50 or more fiber optics and including 100 or more fiber optics. For example, the ratio of beam spot on the flow stream to fiber optics in the optical collection system may be 1:2 or more, such as 1:3 or more, such as 1:4 or more, such as 1:5 or more, such as 1:6 or more, such as 1:7 or more, such as 1:8 or more, such as 1:9 or more, such as 1:10 or more, such as 1:25 or more, such as 1:50 or more and including a ratio of beam spot on the flow stream to fiber optics in the optical collection system of 1:100 or more.

Figure 3:
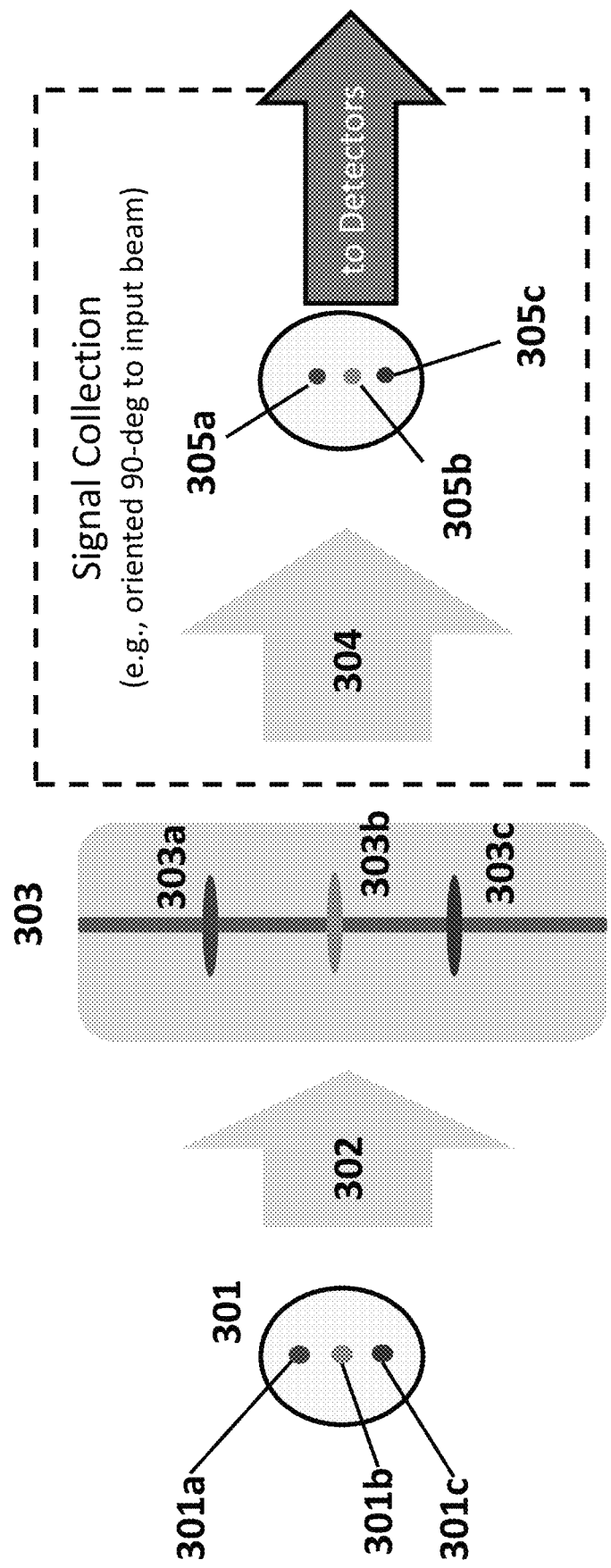
FIG. 3 depicts light collection from an irradiated flow stream according to certain embodiments.

FIG. 3 depicts light collection from an irradiated flow stream according to certain embodiments. The distal end of light propagation component 301 includes fiber optics 301a, 301b and 301c. Light from lasers are conveyed from the distal end of fiber optics 301a, 301b and 301c onto flow stream 303 through magnifying optics 302. Beamspots 303a, 303b and 303c have beam profiles along a horizontal axis of the flow stream (i.e., orthogonal to flow direction). Light from the irradiated flow stream 303 at beamspots 303a, 303b and 303c is collected with imaging optics 304 to matching light collection fiber optics 305a, 305b and 305c which convey the collected light to one or more photodetectors.

In other embodiments, the optical collection unit is a single fiber optic that is configured to convey light from irradiation by each of the lasers to a single photodetector in the light detection system. In these embodiments, the positions of irradiation spanned by the light conveyed by the light propagation component on the flow stream is equal to or less than the diameter of the single fiber optic configured to collect light from the flow stream. For example, light conveyed from the light propagation component may be configured to irradiate positions on the flow stream that span 500 μm or less, such as 450 μm or less, such as 400 μm or less, such as 350 μm or less, such as 300 μm or less and including 100 μm or less and the single fiber optic may have a diameter which is sufficient to collect light from each of the positions irradiated by the light propagation component, such as a diameter of 100 μm or more, such as 150 μm or more, such as 200 μm or more, such as 250 μm or more, such as 300 μm or more and including where the single fiber optic configured to collect light from the irradiated flow stream is 500 μm or more.

In other embodiments, the optical collection system is a free-space light relay system. For instance, the free-space light relay system may include a housing having a proximal end and a distal end, the proximal end being coupled to the light detection system. The free-space relay system may include any combination of different optical components, such as one or more lenses, mirrors, slits, pinholes, wavelength separators, or a combination thereof.

In some embodiments, systems include a flow cell configured to propagate particles in the flow stream. Any convenient flow cell which propagates a fluidic sample to a sample interrogation region may be employed, where in some embodiments, the flow cell includes is a cylindrical flow cell, a frustoconical flow cell or a flow cell that includes a proximal cylindrical portion defining a longitudinal axis and a distal frustoconical portion which terminates in a flat surface having the orifice that is transverse to the longitudinal axis.

In some embodiments, the sample flow stream emanates from an orifice at the distal end of the flow cell. Depending on the desired characteristics of the flow stream, the flow cell orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell of interest has a circular orifice. The size of the nozzle orifice may vary, in some embodiments ranging from 1 m to 20000 μm, such as from 2 μm to 17500 μm, such as from 5 μm to 15000 μm, such as from 10 μm to 12500 μm, such as from 15 μm to 10000 μm, such as from 25 μm to 7500 m, such as from 50 μm to 5000 μm, such as from 75 μm to 1000 μm, such as from 100 m to 750 μm and including from 150 μm to 500 μm. In certain embodiments, the nozzle orifice is 100 μm.

In some embodiments, the flow cell includes a sample injection port configured to provide a sample to the flow cell. In embodiments, the sample injection system is configured to provide suitable flow of sample to the flow cell inner chamber. Depending on the desired characteristics of the flow stream, the rate of sample conveyed to the flow cell chamber by the sample injection port may be 1 μL/min or more, such as 2 μL/min or more, such as 3 μL/min or more, such as 5 μL/min or more, such as 10 μL/min or more, such as 15 μL/min or more, such as 25 μL/min or more, such as 50 μL/min or more and including 100 μL/min or more, where in some instances the rate of sample conveyed to the flow cell chamber by the sample injection port is 1 μL/sec or more, such as 2 μL/sec or more, such as 3 μL/sec or more, such as 5 μL/sec or more, such as 10 μL/sec or more, such as 15 μL/sec or more, such as 25 μL/sec or more, such as 50 μL/sec or more and including 100 μL/sec or more.

The sample injection port may be an orifice positioned in a wall of the inner chamber or may be a conduit positioned at the proximal end of the inner chamber. Where the sample injection port is an orifice positioned in a wall of the inner chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell inner chamber. For example, the sample injection port may be a conduit positioned to have the orifice of the sample injection port in line with the flow cell orifice. Where the sample injection port is a conduit positioned in line with the flow cell orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-section shape of the sample injection tube. For example, the orifice of the sample injection port may include a beveled tip having a bevel angle ranging from 1° to 10°, such as from 2° to 9°, such as from 3° to 8°, such as from 4° to 7° and including a bevel angle of 5°.

In some embodiments, the flow cell also includes a sheath fluid injection port configured to provide a sheath fluid to the flow cell. In embodiments, the sheath fluid injection system is configured to provide a flow of sheath fluid to the flow cell inner chamber, for example in conjunction with the sample to produce a laminated flow stream of sheath fluid surrounding the sample flow stream. Depending on the desired characteristics of the flow stream, the rate of sheath fluid conveyed to the flow cell chamber by the may be 25 μL/sec or more, such as 50 μL/sec or more, such as 75 μL/sec or more, such as 100 μL/sec or more, such as 250 μL/sec or more, such as 500 μL/sec or more, such as 750 μL/sec or more, such as 1000 μL/sec or more and including 2500 μL/sec or more.

In some embodiments, the sheath fluid injection port is an orifice positioned in a wall of the inner chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In some embodiments, systems further include a pump in fluid communication with the flow cell to propagate the flow stream through the flow cell. Any convenient fluid pump protocol may be employed to control the flow of the flow stream through the flow cell. In certain instances, systems include a peristaltic pump, such as a peristaltic pump having a pulse damper. The pump in the subject systems is configured to convey fluid through the flow cell at a rate suitable for multi-photon counting of light from the sample in the flow stream. In some instances, the rate of sample flow in the flow cell is 1 nL/min or more, such as 2 nL/min or more, such as 3 nL/min or more, such as 5 nL/min or more, such as 10 nL/min or more, such as 25 nL/min or more, such as 50 nL/min or more, such as 75 nL/min or more, such as 100 nL/min or more, such as 250 nL/min or more, such as 500 nL/min or more, such as 750 nL/min or more and including 1000 nL/min or more. For example, the system may include a pump that is configured to flow sample through the flow cell at a rate that ranges from 1 nL/min to 500 nL/min, such as from 1 nL/min to 250 nL/min, such as from 1 nL/min to 100 nL/min, such as from 2 nL/min to 90 nL/min, such as from 3 nL/min to 80 nL/min, such as from 4 nL/min to 70 nL/min, such as from 5 nL/min to 60 nL/min and including rom 10 nL/min to 50 nL/min. In certain embodiments, the flow rate of the flow stream is from 5 nL/min to 6 nL/min.

Figure 4A:
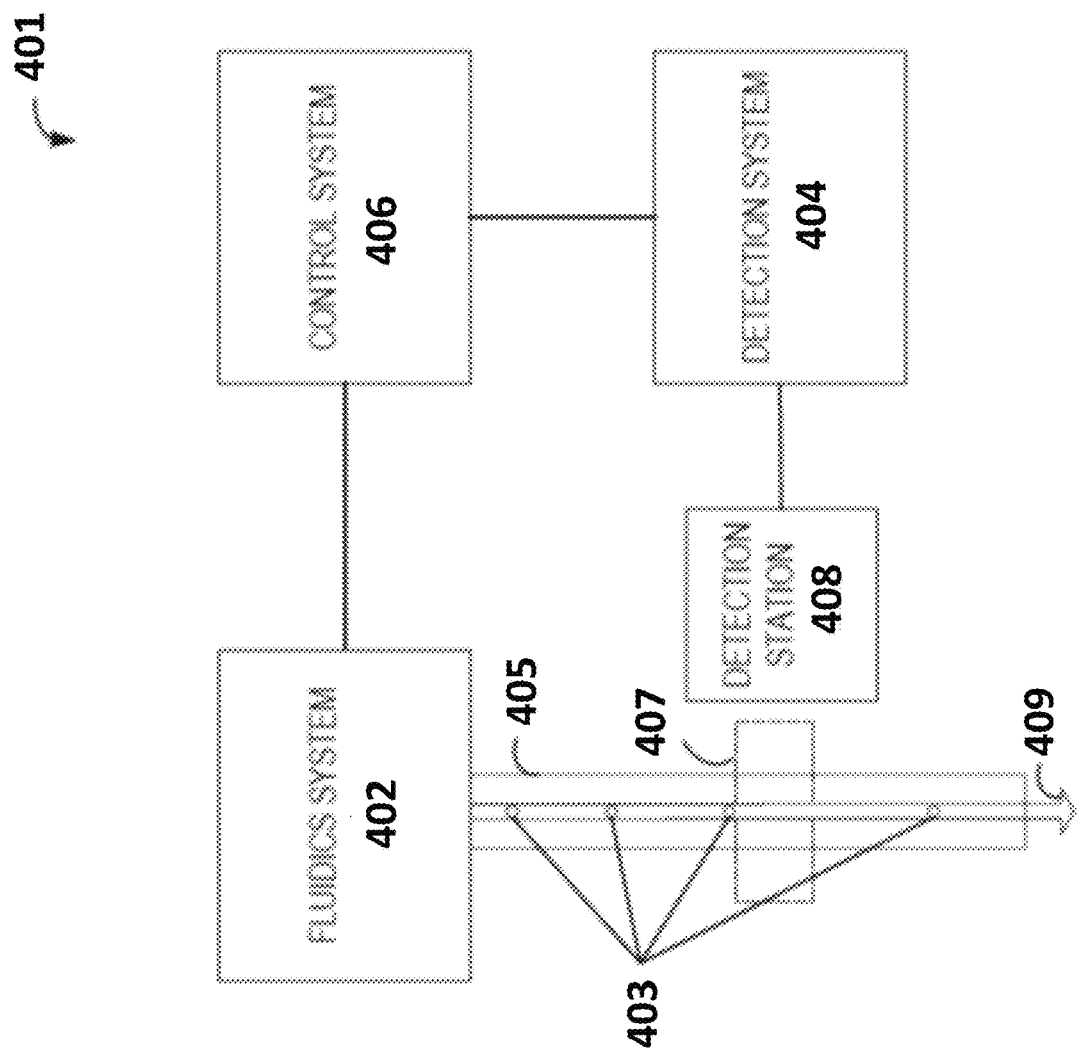
FIG. 4A depicts a functional block diagram of a particle analysis system for computational based sample analysis and particle characterization according to certain embodiments.

In some embodiments, systems are particle analyzers where the particle analysis system 401 (FIG. 4A) can be used to analyze and characterize particles, with or without physically sorting the particles into collection vessels. FIG. 4A shows a functional block diagram of a particle analysis system for computational based sample analysis and particle characterization. In some embodiments, the particle analysis system 401 is a flow system. The particle analysis system 401 shown in FIG. 4A can be configured to perform, in whole or in part, the methods described herein such as. The particle analysis system 401 includes a fluidics system 402. The fluidics system 402 can include or be coupled with a sample tube 405 and a moving fluid column within the sample tube in which particles 403 (e.g., cells) of a sample move along a common sample path 409.

The particle analysis system 401 includes a detection system 404 configured to collect a signal from each particle as it passes one or more detection stations along the common sample path. A detection station 408 generally refers to a monitored area 407 of the common sample path. Detection can, in some implementations, include detecting light or one or more other properties of the particles 403 as they pass through a monitored area 407. In FIG. 4A, one detection station 408 with one monitored area 407 is shown. Some implementations of the particle analysis system 401 can include multiple detection stations. Furthermore, some detection stations can monitor more than one area.

Each signal is assigned a signal value to form a data point for each particle. As described above, this data can be referred to as event data. The data point can be a multidimensional data point including values for respective properties measured for a particle. The detection system 404 is configured to collect a succession of such data points in a first time interval.

The particle analysis system 401 can also include a control system 306. The control system 406 can include one or more processors, an amplitude control circuit and/or a frequency control circuit. The control system shown can be operationally associated with the fluidics system 402. The control system can be configured to generate a calculated signal frequency for at least a portion of the first time interval based on a Poisson distribution and the number of data points collected by the detection system 404 during the first time interval. The control system 406 can be further configured to generate an experimental signal frequency based on the number of data points in the portion of the first time interval. The control system 406 can additionally compare the experimental signal frequency with that of a calculated signal frequency or a predetermined signal frequency.

Figure 4B:
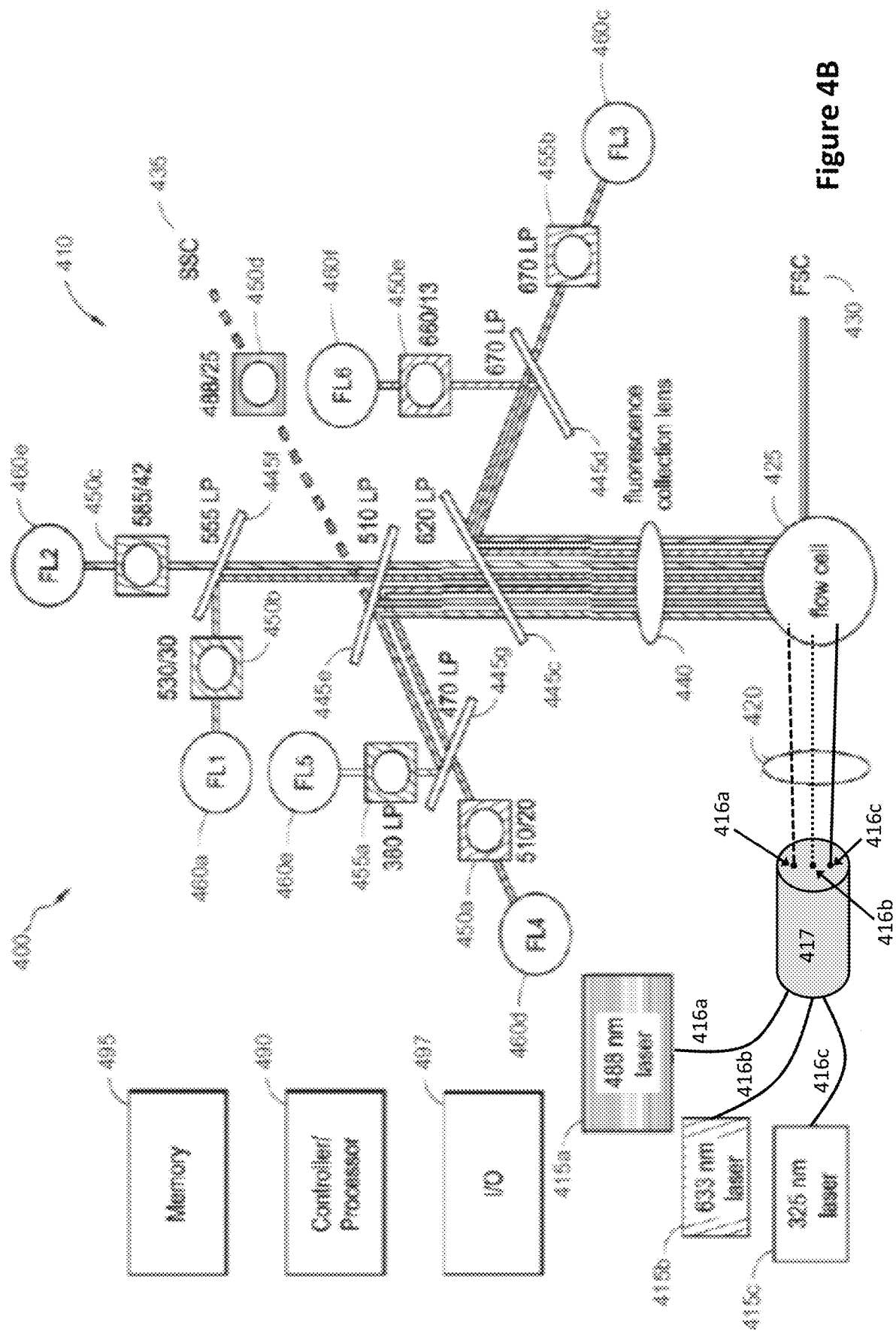
FIG. 4B depicts a flow cytometer according to certain embodiments.

FIG. 4B shows a system 400 for flow cytometry in accordance with an illustrative embodiment of the present invention. The system 400 includes a flow cytometer 410, a controller/processor 490 and a memory 495. The flow cytometer 410 includes one or more excitation lasers 415a-415c, a lens (e.g., a biconic lens) 420, a flow chamber 425, a forward scatter detector 430, a side scatter detector 435, a fluorescence collection lens 440, one or more beam splitters 445c-445g, one or more bandpass filters 450a-450e, one or more longpass ("LP") filters 455a-455b, and one or more fluorescent detectors 460a-460f.

The wavelengths of the laser beams emitted from excitation lasers 415a, 415b and 415c are 488 nm, 633 nm, and 325 nm, respectively, in the example system of FIG. 4B. The laser beams are operably coupled to fiber optics 416a, 416b and 416c of light propagation component 417. Fiber optic 416a conveys light from the 488 nm laser to the distal end of light propagation component 417. Fiber optic 416b conveys light from the 633 nm laser to the distal end of light propagation component 417. Fiber optic 416c conveys light from the 325 nm laser to the distal end of light propagation component 417. Fiber optics 416a, 416b and 416c are arranged in a linear configuration at the distal end of light propagation component 417.

Laser beams conveyed from the distal ends of fiber optics 416a, 416b and 416c are then directed to a lens 420, which conveys the beams onto the portion of a fluid stream where particles of a sample are located, within the flow chamber 425. In some embodiments, lens 420 is a magnifying imaging lens (e.g., a biconic lens) and the distal end of light propagation component 417 is magnified (e.g., by 1.6×) and imaged onto flow chamber 425. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward scatter detector 430, the side scatter detector 435, and the one or more fluorescent detectors 460a-460f through one or more of the beam splitters 445c-445g, the bandpass filters 450a-450e, and the fluorescence collection lens 440.

The fluorescence collection lens 440 collects light emitted from the particle-laser beam interaction and routes that light towards one or more beam splitters and filters. Bandpass filters allow a predetermined range of wavelengths to pass through the filter. For example, one or more of the bandpass filters may be a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters transmit wavelengths of light equal to or longer than a specified wavelength of light. For example, one or more of the bandpass filters may be a 670 nm longpass filter, which transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, one or more of the beam splitters may be a 620 SP beam splitter, meaning that the beam splitter transmits wavelengths of light that are 620 nm or shorter and reflects wavelengths of light that are longer than 620 nm in a different direction. In one embodiment, the beam splitters 445c-445g can comprise optical mirrors, such as dichroic mirrors.

The forward scatter detector 430 is positioned slightly off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 435 is configured to detect refracted and reflected light from the surfaces and internal structures of the particle, and tends to increase with increasing particle complexity of structure. The fluorescence emissions from fluorescent molecules associated with the particle can be detected by the one or more fluorescent detectors 460a-460f. The side scatter detector 435 and fluorescent detectors can include photomultiplier tubes. The signals detected at the forward scatter detector 430, the side scatter detector 435 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 4B, but can include any flow cytometer known in the art. For example, a flow cytometer may have any number of lasers, beam splitters, filters, and detectors at various wavelengths and in various different configurations.

In operation, cytometer operation is controlled by a controller/processor 490, and the measurement data from the detectors can be stored in the memory 495 and processed by the controller/processor 490. Although not shown explicitly, the controller/processor 190 is coupled to the detectors to receive the output signals therefrom, and may also be coupled to electrical and electromechanical components of the flow cytometer 400 to control the lasers, fluid flow parameters, and the like. Input/output (I/O) capabilities 497 may be provided also in the system. The memory 495, controller/processor 490, and I/O 497 may be entirely provided as an integral part of the flow cytometer 410. In such an embodiment, a display may also form part of the I/O capabilities 497 for presenting experimental data to users of the cytometer 400. Alternatively, some or all of the memory 495 and controller/processor 490 and I/O capabilities may be part of one or more external devices such as a general purpose computer. In some embodiments, some or all of the memory 495 and controller/processor 490 can be in wireless or wired communication with the cytometer 410. The controller/processor 490 in conjunction with the memory 495 and the I/O 497 can be configured to perform various functions related to the preparation and analysis of a flow cytometer experiment.

The system illustrated in FIG. 4B includes six different detectors that detect fluorescent light in six different wavelength bands (which may be referred to herein as a "filter window" for a given detector) as defined by the configuration of filters and/or splitters in the beam path from the flow cell 425 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 497 can be configured to receive data regarding a flow cytometer experiment having a panel of fluorescent labels and a plurality of cell populations having a plurality of markers, each cell population having a subset of the plurality of markers. The I/O 497 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 495. The controller/processor 490 can be configured to evaluate one or more assignments of labels to markers.

Figure 5:
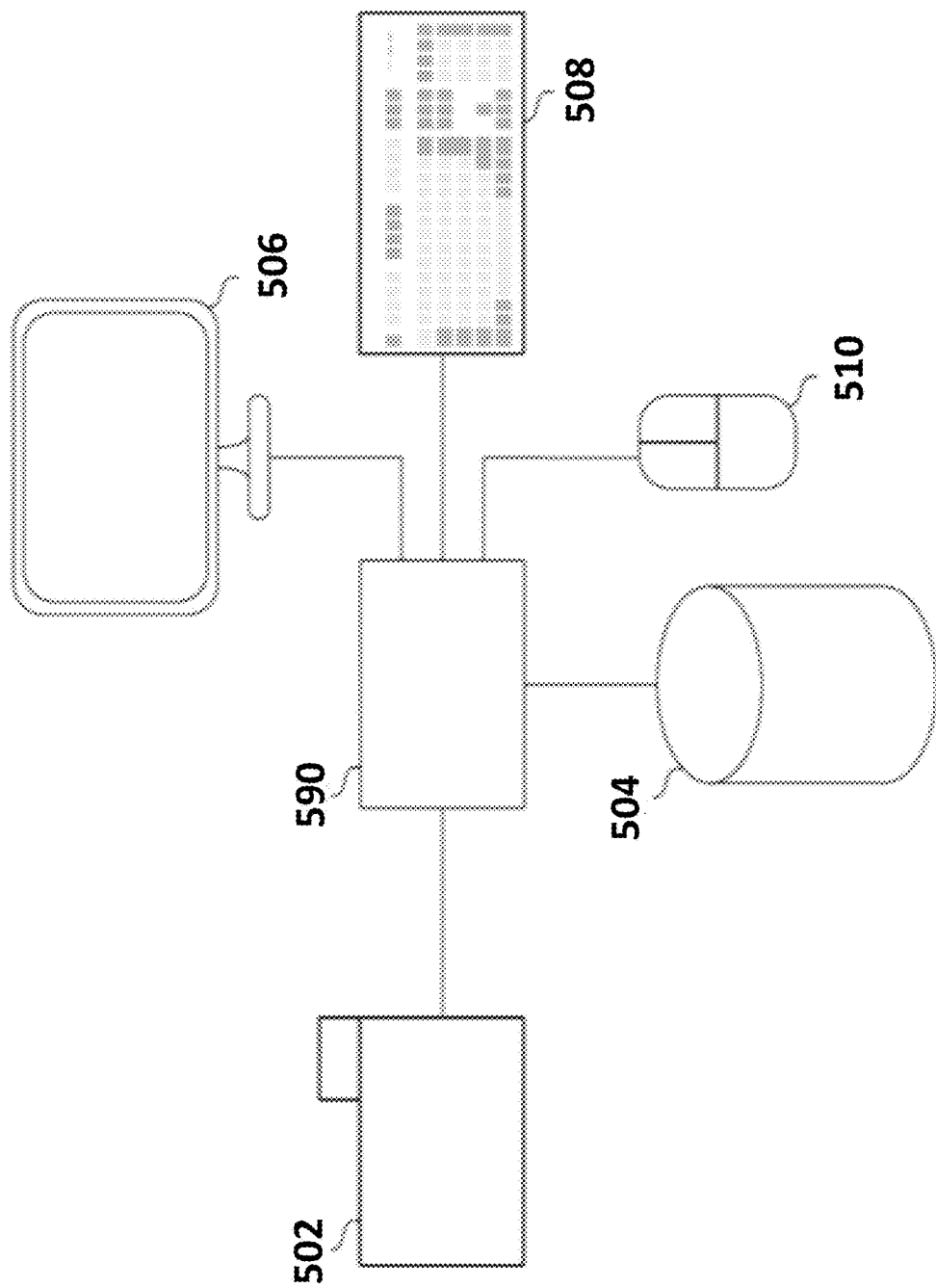
FIG. 5 depicts a functional block diagram for one example of a particle analyzer control system according to certain embodiments.

FIG. 5 shows a functional block diagram for one example of a particle analyzer control system, such as an analytics controller 500, for analyzing and displaying biological events. An analytics controller 500 can be configured to implement a variety of processes for controlling graphic display of biological events.

A particle analyzer 502 can be configured to acquire biological event data. For example, a flow cytometer can generate flow cytometric event data. The particle analyzer 502 can be configured to provide biological event data to the analytics controller 500. A data communication channel can be included between the particle analyzer 502 and the analytics controller 500. The biological event data can be provided to the analytics controller 500 via the data communication channel.

The analytics controller 500 can be configured to receive biological event data from the particle analyzer 502. The biological event data received from the particle analyzer 502 can include flow cytometric event data. The analytics controller 500 can be configured to provide a graphical display including a first plot of biological event data to a display device 506. The analytics controller 500 can be further configured to render a region of interest as a gate around a population of biological event data shown by the display device 506, overlaid upon the first plot, for example. In some embodiments, the gate can be a logical combination of one or more graphical regions of interest drawn upon a single parameter histogram or bivariate plot. In some embodiments, the display can be used to display particle parameters or saturated detector data.

The analytics controller 500 can be further configured to display the biological event data on the display device 506 within the gate differently from other events in the biological event data outside of the gate. For example, the analytics controller 500 can be configured to render the color of biological event data contained within the gate to be distinct from the color of biological event data outside of the gate. The display device 506 can be implemented as a monitor, a tablet computer, a smartphone, or other electronic device configured to present graphical interfaces. The analytics controller 500 can be configured to receive a gate selection signal identifying the gate from a first input device. For example, the first input device can be implemented as a mouse 510. The mouse 510 can initiate a gate selection signal to the analytics controller 500 identifying the gate to be displayed on or manipulated via the display device 506 (e.g., by clicking on or in the desired gate when the cursor is positioned there). In some implementations, the first device can be implemented as the keyboard 508 or other means for providing an input signal to the analytics controller 500 such as a touchscreen, a stylus, an optical detector, or a voice recognition system. Some input devices can include multiple inputting functions. In such implementations, the inputting functions can each be considered an input device. For example, as shown in FIG. 5, the mouse 510 can include a right mouse button and a left mouse button, each of which can generate a triggering event.

The triggering event can cause the analytics controller 500 to alter the manner in which the data is displayed, which portions of the data is actually displayed on the display device 506, and/or provide input to further processing such as selection of a population of interest for particle sorting.

In some embodiments, the analytics controller 500 can be configured to detect when gate selection is initiated by the mouse 510. The analytics controller 500 can be further configured to automatically modify plot visualization to facilitate the gating process. The modification can be based on the specific distribution of biological event data received by the analytics controller 500.

The analytics controller 500 can be connected to a storage device 504. The storage device 504 can be configured to receive and store biological event data from the analytics controller 500. The storage device 504 can also be configured to receive and store flow cytometric event data from the analytics controller 500. The storage device 504 can be further configured to allow retrieval of biological event data, such as flow cytometric event data, by the analytics controller 500.

A display device 506 can be configured to receive display data from the analytics controller 500. The display data can comprise plots of biological event data and gates outlining sections of the plots. The display device 506 can be further configured to alter the information presented according to input received from the analytics controller 500 in conjunction with input from the particle analyzer 502, the storage device 504, the keyboard 508, and/or the mouse 510.

In some implementations, the analytics controller 500 can generate a user interface to receive example events for sorting. For example, the user interface can include a control for receiving example events or example images. The example events or images or an example gate can be provided prior to collection of event data for a sample, or based on an initial set of events for a portion of the sample.

In certain embodiments, the subject systems are particle analyzers employing the above described lasers, light propagation components and light detection system. In certain embodiments, the subject systems are flow cytometric systems. Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem*. January; 49(pt 1):17-28; Linden, et. al., *Semin Throm Hemost*. 2004 October; 30(5):502-11; Alison, et al. *J Pathol*, 2010 December; 222(4):335-344; and Herbig, et al. (2007) *Crit Rev Ther Drug Carrier Syst*. 24(3):203-255; the disclosures of which are incorporated herein by reference. In certain instances, flow cytometry systems of interest include BD Biosciences FACSCanto™ flow cytometer, BD Biosciences FACSCanto™ II flow cytometer, BD Accuri™ flow cytometer, BD Accuri™ C6 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer BD Biosciences LSRFortessa™ flow cytometer, BD Biosciences LSRFortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter and BD Biosciences Via™ cell sorter BD Biosciences Influx™ cell sorter, BD Biosciences Jazz™ cell sorter, BD Biosciences Aria™ cell sorter, BD Biosciences FACSAria™ II cell sorter, BD Biosciences FACSAria™ III cell sorter, BD Biosciences FACSAria™ Fusion cell sorter and BD Biosciences FACSMelody™ cell sorter, BD Biosciences FACSymphony™ S6 cell sorter or the like.

In certain embodiments, the subject systems are configured to sort one or more of the particles (e.g., cells) of the sample. The term "sorting" is used herein in its conventional sense to refer to separating components (e.g., cells, non-cellular particles such as biological macromolecules) of the sample and in some instances delivering the separated components to one or more sample collection containers. For example, the subject systems may be configured for sorting samples having 2 or more components, such as 3 or more components, such as 4 or more components, such as 5 or more components, such as 10 or more components, such as 15 or more components and including soring a sample having 25 or more components. One or more of the sample components may be separated from the sample and delivered to a sample collection container, such as 2 or more sample components, such as 3 or more sample components, such as 4 or more sample components, such as 5 or more sample components, such as 10 or more sample components and including 15 or more sample components may be separated from the sample and delivered to a sample collection container.

In some embodiments, particle sorting systems of interest are configured to sort particles with an enclosed particle sorting module, such as those described in U.S. Patent Publication No. 2017/0299493, filed on Mar. 28, 2017, the disclosure of which is incorporated herein by reference. In certain embodiments, particles (e.g., cells) of the sample are sorted using a sort decision module having a plurality of sort decision units, such as those described in U.S. patent application Ser. No. 16/725,756, filed on Dec. 23, 2019, the disclosure of which is incorporated herein by reference. In some embodiments, the subject particle sorting systems are flow cytometric systems, such those described in U.S. Pat. Nos. 10,663,476; 10,620,111; 10,613,017; 10,605,713; 10,585,031; 10,578,542; 10,578,469; 10,481,074; 10,302,545; 10,145,793; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; 4,987,086; 4,498,766; the disclosures of which are herein incorporated by reference in their entirety.

In certain embodiments, the subject systems are flow cytometric systems having an excitation module that uses radio-frequency multiplexed excitation to generate a plurality of frequency shifted beams of light. In these embodiments, the laser light generator may include a plurality of lasers and one or more acousto-optic components (e.g., an acousto-optic deflector, an acousto-optic frequency shifter) to generate a plurality of frequency shifted comb beams. One or more of the frequency shifted comb beams and local oscillator beams may be configured to be received by a beam shaping component as described here to produce one or more beams of frequency shifted light having a substantially constant intensity profile. In certain instances, the subject systems are flow cytometric systems having a laser excitation module as described in U.S. Pat. Nos. 9,423,353 and 9,784,661 and U.S. Patent Publication Nos. 2017/0133857 and 2017/0350803, the disclosures of which are herein incorporated by reference.

Methods for Irradiating Particles in a Flow Stream

Aspects of the disclosure also include methods for irradiating a sample having particles in a flow stream. Methods according to certain embodiments include irradiating with a light source as described herein, a first position on the flow stream with a first beam of laser light and a second position on the flow stream with a second beam of laser light and detecting light from the irradiated flow stream. As described in detail above, light sources according to certain embodiments for practicing the subject methods include a first laser, a second laser and a light propagation component that includes a first fiber optic operably coupled to the first laser and configured to receive light from the first laser at a proximal end and to convey the laser light from a distal end to a first position on the flow stream and a second fiber optic operably coupled to the second laser and configured to receive light from the second laser at a proximal end and to convey the laser light from a distal end to a second position on the flow stream.

In embodiments, methods include irradiating a flow stream with light conveyed from one or more fiber optics of the light source. In some embodiments, methods include continuously irradiating the flow stream with light conveyed from one or more of the fiber optics of the light source. As described above, by "continuous" is meant irradiation of the flow stream with laser light which is constant and not otherwise interrupted for the duration that a sample of interest is flowed through the flow stream. In some embodiments, laser light conveyed to the flow stream from the light propagation component is unobscured (i.e., not intermittently blocked with a beam stop or obscuration component). In some embodiments, methods include continuously irradiating the flow stream with light conveyed from 1 or more lasers, such as 2 lasers or more configured to provide laser light for continuous irradiation of the flow stream, such as 3 lasers or more, such as 4 lasers or more, such as 5 lasers or more, such as 10 lasers or more, such as 15 lasers or more, such as 25 lasers or more and including continuously irradiating the flow stream with light conveyed from 50 lasers. In some embodiments, methods include irradiating the flow stream in discrete intervals with light conveyed from one or more of the fiber optics of the light source. As described above, by "discrete interval" is meant irradiation of the flow stream for a predetermined duration of time followed by a period of time where the flow stream is not irradiated by light conveyed from the laser (e.g., by turning off the laser or by blocking light laser conveyed from the light propagation component such as with a chopper, beam stop, etc.). In some embodiments, laser light from the light propagation component is conveyed to the flow stream in discrete intervals of 0.001 μs or more, such as for 0.005 μs or more, such as for 0.01 μs or more, such as for 0.05 μs or more, such as for 0.1 μs or more, such as for 0.5 μs or more, such as for 1 μs or more, such as for 5 μs or more, such as for 10 μs or more, such as for 50 μs or more, such as for 100 μs or more and including for 500 μs or more. In certain instances, laser light from the light propagation component is conveyed to the flow stream in discrete intervals of from 0.0001 μs to 500 ms, such as from 0.0005 μs to 250 ms, such as from 0.001 μs to 50 ms, such as from 0.005 μs to 5 ms, such as from 0.01 μs to 1000 μs, such as from 0.05 to 750 μs, such as from 0.1 μs to 500 μs, such as from 0.5 μs to 250 μs, such as from 1 μs to 100 μs and including from 10 μs to 100 μs. The duration between each discrete interval may be 0.001 μs or more, such as 0.005 μs or more, such as 0.01 μs or more, such as 0.05 μs or more, such as 0.1 μs or more, such as 0.5 μs or more, such as 1 μs or more, such as 5 μs or more, such as 10 μs or more, such as 50 μs or more, such as 100 μs or more and including 500 μs or more. For example, the duration between each discrete interval may range from 0.0001 μs to 500 ms, such as from 0.0005 μs to 250 ms, such as from 0.001 μs to 50 ms, such as from 0.005 μs to 5 ms, such as from 0.01 μs to 1000 μs, such as from 0.05 to 750 μs, such as from 0.1 μs to 500 μs, such as from 0.5 μs to 250 μs, such as from 1 μs to 100 μs and including from 10 μs to 100 μs. In some embodiments, methods include irradiating the flow stream in discrete intervals with light conveyed from 1 or more lasers, such as 2 lasers or more, such as 3 lasers or more, such as 4 lasers or more, such as 5 lasers or more, such as 10 lasers or more, such as 15 lasers or more, such as 25 lasers or more and including irradiating the flow stream in discrete intervals with light conveyed from 50 lasers or more.

In certain instances, irradiation of the flow stream includes maintaining a constant laser irradiation intensity, such as a laser irradiation intensity that changes by 5% or less for the duration that a sample of interest is flowed through the flow stream, such as by 4% or less, such as by 3% or less, such as by 2% or less, such as by 1% or less, such as by 0.5% or less, such as by 0.1% or less, such as by 0.01% or less, such as by 0.001% or less and including a laser irradiation intensity that changes by 0.0001% or less. In certain embodiments, continuous irradiation of the flow stream includes irradiating the flow stream with laser light that exhibits no change in intensity for the duration that a sample is flowed through the flow stream. The intensity of light output can be measured with any convenient protocol, including but not limited to, a scanning slit profiler, a charge coupled device (CCD, such as an intensified charge coupled device, ICCD), a positioning sensor, power sensor (e.g., a thermopile power sensor), optical power sensor, energy meter, digital laser photometer, a laser diode detector, among other types of photodetectors.

In embodiments, methods include irradiating the flow stream at different positions on the flow stream. In some embodiments, the light propagation component is configured to convey laser light onto a flow stream in a predetermined pattern, such as a pattern having a rectilinear cross sectional shape, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, light from the light propagation component is conveyed onto the flow stream in a linear pattern. In some instances, light from the light propagation component is conveyed onto the flow stream in a linear pattern that is parallel to the longitudinal axis of the flow stream (i.e., parallel to the direction of sample flow). In other instances, light from the light propagation component is conveyed onto the flow stream in a linear pattern that is orthogonal to the longitudinal axis of the flow stream (i.e., across a horizontal axis of the flow stream). The distance between the positions of irradiation on the flow stream by light conveyed by each fiber optic (e.g., when arranged in a line pattern) may be 0.0001 mm or more, such as 0.0005 mm or more, such as 0.001 mm or more, such as 0.005 mm or more, such as 0.01 mm or more, such as 0.05 mm or more, such as 0.1 mm or more, such as 0.2 mm or more, such as 0.3 mm or more, such as 0.5 mm or more, such as 0.6 mm or more, such as 0.7 mm or more, such as 0.8 mm or more, such as 0.9 mm or more, such as 1.0 mm or more, such as 2 mm or more and including 3 mm or more. In some embodiments, the distance between the position of irradiation on the flow stream by light conveyed by each fiber optic ranges from 0.0001 mm to 5 mm, such as from 0.0005 mm to 4.5 mm, such as from 0.001 mm to 4.0 mm, such as from 0.005 mm to 3.5 mm, such as from 0.01 mm to 3.0 mm, such as from 0.05 mm to 2.5 mm, such as from 0.1 mm to 2.0 mm and including from 0.2 mm to 1.5 mm.

In some embodiments, light from the light propagation component is conveyed from a first fiber optic to a first position on the flow stream and from a second fiber optic to a second position on the flow stream. In some instances, the second position is downstream from the first position on the flow stream. For example, the second position may be 0.0001 mm or more downstream from the first position on the flow stream, such as 0.0005 mm or more, such as 0.001 mm or more, such as 0.005 mm or more, such as 0.01 mm or more, such as 0.05 mm or more, such as 0.1 mm or more, such as 0.2 mm or more, such as 0.3 mm or more, such as 0.5 mm or more, such as 0.6 mm or more, such as 0.7 mm or more, such as 0.8 mm or more, such as 0.9 mm or more, such as 1.0 mm or more, such as 2 mm or more and including 3 mm or more downstream from the first position on the flow stream. In some instances, the second position is downstream from the first position on the flow stream by a distance that ranges from 0.0001 mm to 5 mm, such as from 0.0005 mm to 4.5 mm, such as from 0.001 mm to 4.0 mm, such as from 0.005 mm to 3.5 mm, such as from 0.01 mm to 3.0 mm, such as from 0.05 mm to 2.5 mm, such as from 0.1 mm to 2.0 mm and including from 0.2 mm to 1.5 mm. In certain embodiments, the second position is 0.2 mm or more downstream from the first position on the flow stream.

In other embodiments, light from the light propagation component is conveyed from a plurality of fiber optics to a plurality of different positions on the flow stream. The distance between positions on the flow stream irradiated by light conveyed from each of the fiber optics in the light propagation component may vary, where the inter-irradiation space is independently 0.0001 µm or more, such as 0.0005 µm or more, such as 0.001 µm or more, such as 0.005 µm or more, such as 0.01 µm or more, such as 0.05 µm or more, such as 0.1 µm or more, such as 0.5 µm or more, such as 1 µm or more, such as 2 µm or more, such as 3 µm or more, such as 4 µm or more, such as 5 µm or more, such as 6 µm or more, such as 7 µm or more, such 8 µm or more, such as 9 µm or more and including 10 µm or more. In certain instances, methods include conveying light from the light propagation component to positions on the flow stream that are immediately adjacent to each other (i.e., there is no inter-irradiation space). In other embodiments, the inter-irradiation space is independently 0.0001 mm or more, such as 0.0005 mm or more, such as 0.001 mm or more, such as 0.005 mm or more, such as 0.01 mm or more, such as 0.05 mm or more, such as 0.1 mm or more, such as 0.2 mm or more, such as 0.3 mm or more, such as 0.5 mm or more, such as 0.6 mm or more, such as 0.7 mm or more, such as 0.8 mm or more, such as 0.9 mm or more, such as 1.0 mm or more, such as 2 mm or more and including 3 mm or more.

Depending on the desired wavelengths of light for irradiating the flow stream, each laser may have a specific wavelength that varies from 200 nm to 1500 nm, such as from 250 nm to 1250 nm, such as from 300 nm to 1000 nm, such as from 350 nm to 900 nm and including from 400 nm to 800 nm. In certain embodiments, methods include irradiating the flow stream with light from one or more lasers having an irradiation wavelength of 405 nm, 488 nm, 561 nm and 635 nm.

The flow stream may be irradiated by the light conveyed from the light propagation component from any suitable distance from, such as at a distance of 0.001 mm or more from the flow stream, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or. In addition, irradiation of the flow stream may be at any suitable angle (e.g., relative the vertical axis of the flow stream), such as at an angle ranging from 10° to 90°, such as from 15° to 85°, such as from 20° to 80°, such as from 25° to 75° and including from 30° to 60°, for example at a 90° angle.

In some embodiments, methods include conveying light to the flow stream from the distal end of one or more of the fiber optics that has a predetermined beam profile. In some instances, methods include conveying light from the distal end of one or more of the fiber optics of the light propagation component through a beam shaping component. In some embodiments, the beam shaping component is configured to generate an output beam of light having a beam profile with an intensity at the center that is from 75% to 99.9% of the intensity at the edges along one or more of the horizontal axis and the vertical axis. In some embodiments, the beam shaping component is configured to generate an output beam of light having a beam profile with a substantially constant intensity from each edge to the center, such as where the intensity across the horizontal axis of the beam profile varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.05% or less, such as by 0.01% or less and including where the intensity across the horizontal axis of the beam profile varies by 0.001% or less. In other embodiments, the beam shaping component is configured to generate an output beam of light having a beam profile with a substantially constant intensity from each edge to the center, such as where the intensity across the vertical axis of the beam profile varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.05% or less, such as by 0.01% or less and including where the intensity across the vertical axis of the beam profile varies by 0.001% or less.

In other embodiments, the beam shaping component is configured to generate an output beam of light from one or more of the fiber optics in the light propagation component having a super Gaussian intensity profile along the horizontal axis. The term "super Gaussian" is used herein in its conventional sense to refer to a beam of irradiation having an energy density that is slightly greater at the center of the beam profile along one or more axes orthogonal to the optical axis of the beam of irradiation. In embodiments, output beams of light having a super Gaussian intensity profile exhibit greater fluence at the edges of the beam along the horizontal axis than a corresponding Gaussian intensity profile. In one example, beams of light having a super Gaussian intensity profile have an intensity at the edges that is from 70%-90% of the intensity at the center of the beam along the horizontal axis, such as from 75%-85% and including an intensity at the edges that is from 80%-90% of the intensity at the center of the beam along the horizontal axis.

In some embodiments, light conveyed from the distal end of the light propagation component is imaged onto the flow stream. In some instances, imaging the light from the distal end of the light propagation component includes magnifying light conveyed from the distal end of the light propagation component onto the flow stream. For example, methods may include magnifying light conveyed from the distal end of the light propagation component onto the flow stream by 1.1× or more, such as by 1.2× or more, such as by 1.3× or more, such as by 1.4× or more, such as by 1.5× or more, such as by 1.6× or more, such as by 1.7× or more, such as by 1.8× or more, such as by 1.9× or more, such as by 2× or more, such as by 2.5× or more, such as by 3× or more, such as by 3.5× or more, such as by 4× or more, such as by 4.5× or more and including by 5× or more. In certain embodiments, methods include from 1.1× to 10× magnification, such as from 1.2× to 9×, such as from 1.3× to 8×, such as from 1.4× to 7×, such as from 1.5× to 6×, such as from 1.6× to 5×, such as from 1.7× to 4×, such as from 1.8× to 3× and including from 1.9× to 2.5× magnification.

Methods of the present disclosure, according to certain embodiments, also include detecting light from particles in the flow stream. In embodiments, light from the flow stream is conveyed to and detected with a light detection system having one or more photodetectors. Photodetectors for practicing the subject methods may be any convenient light detecting protocol, including but not limited to photosensors or photodetectors, such as active-pixel sensors (APSs), quadrant photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. Light from particles in the flow stream may be detected using 1 photodetector or more, such as 2 photodetectors or more, such as 3 photodetectors or more, such as 4 photodetectors or more, such as 5 photodetectors or more, such as 10 photodetectors or more, such as 25 photodetectors or more and including 50 photodetectors or more.

In certain embodiments, light from particles in the flow stream is detected with a photodiode array having more than one photodiode, such as two or more photodiodes, such as three or more, such as five or more and including 10 or more photodiodes, where each photodiode may have an active detecting surface area of each region that ranges from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

In some embodiments, light from the particles in the flow stream may be measured at one or more wavelengths, such as at 2 or more wavelengths, such as at 5 or more different wavelengths, such as at 10 or more different wavelengths, such as at or more different wavelengths, such as at 50 or more different wavelengths, such as at 100 or more different wavelengths, such as at 200 or more different wavelengths, such as at 300 or more different wavelengths and including measuring light from particles in the flow stream at 400 or more different wavelengths.

In embodiments, light may be measured by the photodetectors continuously or in discrete intervals. In some instances, detectors of interest are configured to take measurements of the collected light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Light from the flow stream may be measure with each photodetector at any suitable distance from the flow stream so long as a usable light signal is detectable. For example, detectors may be positioned 1 mm or more from the flow stream, such as 5 mm or more, such as 10 mm or more, such as 15 mm or more, such as 25 mm or more, such as 50 mm or more, such as 100 mm or more, such as 150 mm or more, such as 250 mm or more and including 500 mm or more from the flow stream. The detectors may also be positioned at any angle from the flow stream. For example, the detectors may be angled with respect to the vertical axis of the flow stream at from 10° to 90°, such as from 15° to 85°, such as from 20° to 80°, such as from 25° to 75° and including from 30° to 60°. In some instances, the one or more detectors are positioned at 30° to 60° with respect to the vertical axis of the flow stream.

In embodiments, methods may include detecting forward scattered light, side scattered light, emitted light, transmitted light or a combination thereof. In certain embodiments, the light signals from the irradiated flow stream may be detected by one or more detectors configured as forward scatter detectors. In these embodiments, the forward scatter detectors are positioned on the opposite side of the flow stream from the light source and are positioned to collect and detect forward propagated (e.g., scattered) light.

In certain embodiments, methods include detecting light from each of the lasers with a single photodetector. In these embodiments, the photodetector detects light from particles in the flow stream that are irradiated with the laser configured for continuous irradiation and each laser that is configured for irradiation in discrete intervals.

In some embodiments, methods include collecting and directing light from the flow stream to the photodetectors with an optical collection system. In some embodiments, the optical collection system includes fiber optics. For example, in some instances the optical collection system may be a fiber optics light relay bundle and light is conveyed through the fiber optics light relay bundle to the light detection system. In some instances, the optical collection system includes 2 or more fiber optics, such as 3 or more fiber optics, such as 4 or more fiber optics, such as 5 or more fiber optics, such as 6 or more fiber optics, such as 7 or more fiber optics, such as 8 or more fiber optics, such as 9 or more fiber optics, such as 10 or more fiber optics, such as 25 or more fiber optics, such as 50 or more fiber optics and including 100 or more fiber optics. In certain embodiments, the optical collection system includes one or more fiber optic bundles, such as 2 or more fiber optic bundles, such as 3 or more fiber optic bundles, such as 4 or more fiber optic bundles and including 5 or more fiber optic bundles.

In some embodiments, each beam spot on the flow stream is operably coupled to a single fiber optic in the optical collection system. In other embodiments, each beam spot on the flow stream is operably coupled to more than one fiber optic in the optical collection system, such as where each beam spot on the flow stream is operably coupled to 2 or more fiber optics, such as 3 or more fiber optics, such as 4 or more fiber optics, such as 5 or more fiber optics, such as 6 or more fiber optics, such as 7 or more fiber optics, such as 8 or more fiber optics, such as 9 or more fiber optics, such as 10 or more fiber optics, such as 25 or more fiber optics, such as 50 or more fiber optics and including 100 or more fiber optics. For example, the ratio of beam spot on the flow stream to fiber optics in the optical collection system may be 1:2 or more, such as 1:3 or more, such as 1:4 or more, such as 1:5 or more, such as 1:6 or more, such as 1:7 or more, such as 1:8 or more, such as 1:9 or more, such as 1:10 or more, such as 1:25 or more, such as 1:50 or more and including a ratio of beam spot on the flow stream to fiber optics in the optical collection system of 1:100 or more.

In certain embodiments, the optical collection system is a single fiber optic that is configured to covey light from irradiation by each of the lasers to a single photodetector in the light detection system. In these embodiments, methods include conveying light to the flow stream from the light propagation component to positions that span a length that is equal to or less than the diameter of the single fiber optic configured to collect light from the flow stream. For example, methods may include conveying light to positions on the flow stream that span 100 µm or less, such as 90 µm or less, such as 80 µm or less, such as 70 µm or less, such as 60 µm or less and including 50 µm or less and the single fiber optic may have a diameter which is sufficient to collect light from each of the positions irradiated, such as a diameter of 50 µm or more, such as 60 µm or more, such as 70 µm or more, such as 80 µm or more, such as 90 µm or more and including where the single fiber optic has a diameter that is 100 µm or more.

In other embodiments, light from the flow stream is conveyed to the photodetectors using a free-space light relay system. For instance, the free-space light relay system may include a housing having a proximal end and a distal end, the proximal end being coupled to the light detection system. The free-space relay system may include any combination of different optical components, such as one or more lenses, mirrors, slits, pinholes, wavelength separators, or a combination thereof.

Measurements of the collected light may be taken one or more times during the subject methods, such as 2 or more times, such as 3 or more times, such as 5 or more times and including 10 or more times. In certain embodiments, the light propagation is measured 2 or more times, with the data in certain instances being averaged.

In some embodiments, methods include adjusting the light before detecting the light with the light detection systems. For example, the light from the sample source may be passed through one or more lenses, mirrors, pinholes, slits, gratings, light refractors, and any combination thereof. In some instances, the collected light is passed through one or more focusing lenses, such as to reduce the profile of the light directed to the light detection system or optical collection system as described above. In other instances, the emitted light from the sample is passed through one or more collimators to reduce light beam divergence conveyed to the light detection system.

In certain embodiments, methods include determining the overlap of the spectra of light from the flow stream and calculating the contribution of each to the overlapping detected light spectra. In some embodiments, spectrally resolving light includes calculating a spectral unmixing matrix. In certain embodiments, methods include calculating a spectral unmixing matrix to estimate the abundance of each contribution to the detected light signal by the photodetectors.

In some instances, calculating the spectral unmixing matrix includes determining the abundance of a fluorophore associated with a particle in the flow stream. The abundance of each fluorophore associated with the particle may be used in identifying and classifying a particle. In some instances, identified or classified particles may be used to sort particles of interest (e.g., cells) in the sample. In certain embodiments, calculating spectral unmixing, is conducted so that sorting is sufficiently fast to sort particles in real time after detection by the light detection system.

In certain embodiments, methods include spectrally resolving light detected by the plurality of photodetectors such as described e.g., in International Patent Application No. PCT/US2019/068395 filed on Dec. 23, 2019; U.S. Provisional Patent Application No. 62/971,840 filed on Feb. 7, 2020 and U.S. Provisional Patent Application No. 63/010,890 filed on Apr. 16, 2020, the disclosures of which are herein incorporated by reference in their entirety. For example, spectrally resolving light detected by the plurality of photodetectors may be include solving a spectral unmixing matrix using one or more of: 1) a weighted least square algorithm; 2) a Sherman-Morrison iterative inverse updater; 3) an LU matrix decomposition, such as where a matrix is decomposed into a product of a lower-triangular (L) matrix and an upper-triangular (U) matrix; 4) a modified Cholesky decomposition; 5) by QR factorization; and 6) calculating a weighted least squares algorithm by singular value decomposition.

In some embodiments, methods include irradiating a sample in a flow stream (e.g., in a particle analyzer of a flow cytometer). In some embodiments, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, or other biological liquid sample, e.g., tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While embodiments of the present disclosure may be applied to samples from a human subject, it is to be understood that the methods may also be carried-out on samples from other animal subjects (that is, in "non-human subjects") such as, but not limited to, birds, mice, rats, dogs, cats, livestock and horses.

In certain embodiments, the biological sample contains cells. Cells that may be present in the sample include eukaryotic cells (e.g., mammalian cells) and/or prokaryotic cells (e.g., bacterial cells or archaeal cells). Samples may be obtained from an in vitro source (e.g., a suspension of cells from laboratory cells grown in culture) or from an in vivo source (e.g., a mammalian subject, a human subject, etc.). In some embodiments, the cellular sample is obtained from an in vitro source. In vitro sources include, but are not limited to, prokaryotic (e.g., bacterial, archaeal) cell cultures, environmental samples that contain prokaryotic and/or eukaryotic (e.g., mammalian, protest, fungal, etc.) cells, eukaryotic cell cultures (e.g., cultures of established cell lines, cultures of known or purchased cell lines, cultures of immortalized cell lines, cultures of primary cells, cultures of laboratory yeast, etc.), tissue cultures, and the like.

Where the biological sample includes cells, methods of the present disclosure may include characterizing components of the cells, such as cell fragments, fragmented cell membranes, organelles, dead or lysed cells. In some embodiments, methods include characterizing the extracellular vesicles of the cells. Characterizing the extracellular vesicles of the cells may include identifying the type of extracellular vesicles in the cells or determining the size of the extracellular vesicles in the cells.

In some embodiments, methods further include sorting one or more particles (e.g., cells) of the sample. The term "sorting" is used herein in its conventional sense to refer to separating components (e.g., cells, non-cellular particles such as biological macromolecules) of the sample and in some instances delivering the separated components to one or more sample collection containers. For example, methods may include sorting samples having 2 or more components, such as 3 or more components, such as 4 or more components, such as 5 or more components, such as 10 or more components, such as 15 or more components and including soring a sample having 25 or more components. One or more of the sample components may be separated from the sample and delivered to a sample collection container, such as 2 or more sample components, such as 3 or more sample components, such as 4 or more sample components, such as 5 or more sample components, such as 10 or more sample components and including 15 or more sample components may be separated from the sample and delivered to a sample collection container.

In some embodiments, methods for sorting components of a sample include sorting particles (e.g., cells in a biological sample), such as described in U.S. Pat. Nos. 3,960,449; 4,347,935; 4,667,830; 5,245,318; 5,464,581; 5,483,469; 5,602,039; 5,643,796; 5,700,692; 6,372,506 and 6,809,804, the disclosures of which are herein incorporated by reference. In some embodiments, methods include sorting components of the sample with a particle sorting module, such as those described in U.S. Pat. Nos. 9,551,643 and 10,324,019, U.S. Patent Publication No. 2017/0299493 and International Patent Publication No. WO/2017/040151, the disclosure of which is incorporated herein by reference. In certain embodiments, cells of the sample are sorted using a sort decision module having a plurality of sort decision units, such as those described in U.S. patent application Ser. No. 16/725,756, filed on Dec. 23, 2019, the disclosure of which is incorporated herein by reference.

Computer-Controlled Systems

Aspects of the present disclosure further include computer controlled systems for practicing the subject methods, where the systems further include one or more computers for complete automation or partial automation of a system for practicing methods described herein. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described having a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid state storage devices (including magnetic or optical disks or tape or RAM, or any other suitable device, either fixed or portable). The processor may include a general purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows NT®, Windows XP, Windows 7, Windows 8, iOS, Sun Solaris, Linux, OS/400, Compaq Tru64 Unix, SGI IRIX, Siemens Reliant Unix, Ubuntu, Zorin OS and others.

Figure 6:
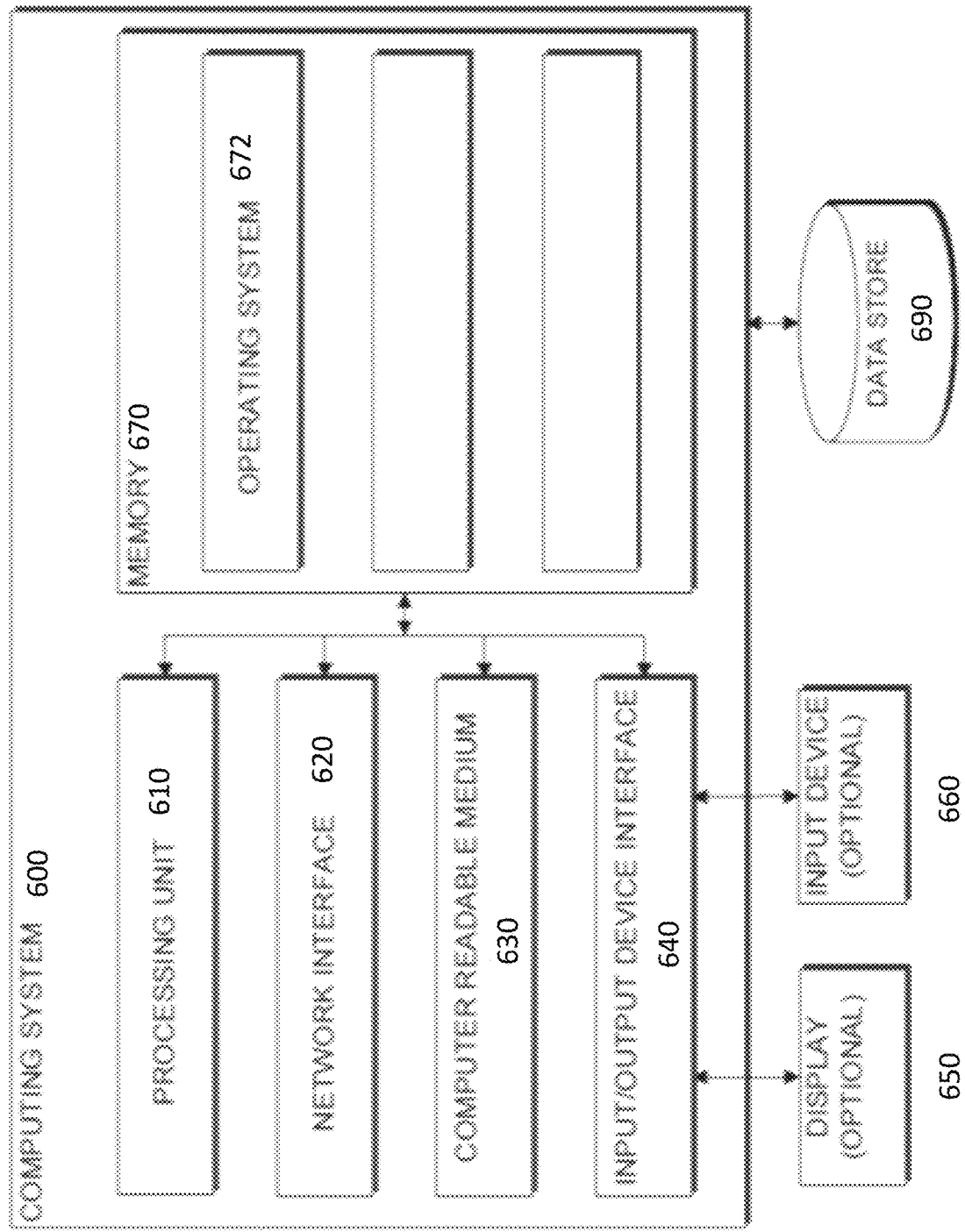
FIG. 6 depicts a block diagram of a computing system according to certain embodiments.

FIG. 6 depicts a general architecture of an example computing device 600 according to certain embodiments. The general architecture of the computing device 600 depicted in FIG. 6 includes an arrangement of computer hardware and software components. The computing device 600 may include many more (or fewer) elements than those shown in FIG. 6. It is not necessary, however, that all of these generally conventional elements be shown in order to provide an enabling disclosure. As illustrated, the computing device 600 includes a processing unit 610, a network interface 620, a computer readable medium drive 630, an input/output device interface 640, a display 650, and an input device 660, all of which may communicate with one another by way of a communication bus. The network interface 620 may provide connectivity to one or more networks or computing systems. The processing unit 610 may thus receive information and instructions from other computing systems or services via a network. The processing unit 610 may also communicate to and from memory 670 and further provide output information for an optional display 650 via the input/output device interface 640. The input/output device interface 840 may also accept input from the optional input device 660, such as a keyboard, mouse, digital pen, microphone, touch screen, gesture recognition system, voice recognition system, gamepad, accelerometer, gyroscope, or other input device.

The memory 670 may contain computer program instructions (grouped as modules or components in some embodiments) that the processing unit 610 executes in order to implement one or more embodiments. The memory 670 generally includes RAM, ROM and/or other persistent, auxiliary or non-transitory computer-readable media. The memory 670 may store an operating system 672 that provides computer program instructions for use by the processing unit 610 in the general administration and operation of the computing device 600. The memory 670 may further include computer program instructions and other information for implementing aspects of the present disclosure.

Non-Transitory Computer-Readable Storage Medium

Aspects of the present disclosure further include non-transitory computer readable storage mediums having instructions for practicing the subject methods. Computer readable storage mediums may be employed on one or more computers for complete automation or partial automation of a system for practicing methods described herein. In certain embodiments, instructions in accordance with the methods described herein can be coded onto a computer-readable medium in the form of "programming", where the term "computer readable medium" as used herein refers to any non-transitory storage medium that participates in providing instructions and data to a computer for execution and processing. Examples of suitable non-transitory storage media include a floppy disk, hard disk, optical disk, magneto-optical disk, CD-ROM, CD-R, magnetic tape, non-volatile memory card, ROM, DVD-ROM, Blue-ray disk, solid state disk, and network attached storage (NAS), whether or not such devices are internal or external to the computer. A file containing information can be "stored" on computer readable medium, where "storing" means recording information such that it is accessible and retrievable at a later date by a computer. The computer-implemented method described herein can be executed using programming that can be written in one or more of any number of computer programming languages. Such languages include, for example, Java (Sun Microsystems, Inc., Santa Clara, CA), Visual Basic (Microsoft Corp., Redmond, WA), and C++ (AT&T Corp., Bedminster, NJ), as well as any many others.

The non-transitory computer readable storage medium may be employed on one or more computer systems having a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques.

Kits

Aspects of the present disclosure further include kits, where kits include two or more lasers and a light propagation component that includes fiber optics configured to operably couple to the lasers. In some embodiments, one or more of the lasers is a continuous wave laser. In some instances, one or more of the fiber optics is a single-mode fiber optic. In other instances, one or more of the fiber optics is a multimode fiber optic. In certain instances, kits include one or more fiber optic bundles. Kits may further include one or more additional optical adjustment components, such as one or more mirrors, beam shapers such as a Powell lens as described herein. In certain embodiments, kits include a biconic lens. In other embodiments, kits include an achromatic optical assembly. The various components of the kits may be present in separate containers, or some or all of them may be pre-combined. For example, in some instances, one or more components of the kit, e.g., the lasers, light propagation component and optical adjustment components are present in a separate sealed pouch, e.g., a sterile foil pouch or envelope.

In addition to the above components, the subject kits may further include (in certain embodiments) instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject systems, methods, and computer systems find use in a variety of applications where it is desirable to analyze and sort particle components in a sample in a fluid medium, such as a biological sample. The present disclosure also finds use in flow cytometry where it is desirable to provide a flow cytometer with improved cell sorting accuracy, enhanced particle collection, reduced energy consumption, particle charging efficiency, more accurate particle charging and enhanced particle deflection during cell sorting. In embodiments, the present disclosure reduces the need for user input or manual adjustment during sample analysis with a flow cytometer. In certain embodiments, the subject systems provide fully automated protocols so that adjustments to a flow cytometer during use require little, if any human input.

The present disclosure also finds use in applications where cells prepared from a biological sample may be desired for research, laboratory testing or for use in therapy. In some embodiments, the subject methods and devices may facilitate the obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A system comprising:
   a flow cell comprising a flow path for propagating a flow stream; and
   a light propagation component comprising a fiber optic bundle comprising:
      a first fiber optic operably coupled to a first laser and configured to receive light from the first laser at a proximal end and to convey the laser light from a distal end; and
      a second fiber optic operably coupled to a second laser and configured to receive light from the second laser at a proximal end and to convey the laser light from a distal end;
      a single lens configured to convey the light from the distal end of the first fiber optic to a first position on the flow stream and to convey the light from the distal end of the second fiber optic to a second position on the flow stream; and
   a light detection component comprising :
      a single fiber optic confgured to receive light from the first position and the second position on the flow stream; and
      a photodetector for detecting light from the first position on the flow stream and the second position on the flow stream.

2. The system according to claim 1, wherein the first laser and the second laser are continuous wave lasers.

3. The system according to claim 1, wherein the second position is downstream from the first position on the flow stream.

4. The system according to claim 1, wherein the lens is a bionic lens.

5. The system according to claim 1, wherein the distal end of each of the first fiber optic and the second fiber optic is configured to generate a predetermined beam profile on the flow stream for each beam of laser light.

6. The system according to claim 5, wherein the distal end of each of the first fiber optic and the second fiber optic is configured to generate a substantially constant beam profile across a horizontal axis of the flow stream for each beam of laser light.

7. The system according to claim 6, wherein the distal end of each of the first fiber optic and the second fiber optic is configured to generate a top-hat beam profile across a horizontal axis of the flow stream for each beam of laser light.

8. The system according to claim 5, wherein the distal end of each of the first fiber optic and the second fiber optic comprises a polygonal cross-section.

9. The system according to claim 1, wherein the light propagation component further comprises a third fiber optic operably coupled to a third laser.

10. The system according to claim 9, wherein the light propagation component is configured to receive light from the lasers and to propagate a beam of light from each laser to a different position on the flow stream.

11. The system according to claim 1, wherein the photodetector is configured to detect light from the flow stream irradiated by each of the lasers.

12. The system according to claim 11, wherein the photodetector comprises a photodetector array.

13. The system according to claim 1, wherein the system is a particle analyzer.

14. The system according to claim 13, wherein the particle analyzer is a part of a flow cytometer.

* * * * *